US012658351B2

(12) United States Patent
Cercado et al.

(10) Patent No.: US 12,658,351 B2

(45) Date of Patent: Jun. 16, 2026

(54) STACKED MAGNETIC CORES HAVING SMALL FOOTPRINTS

(71) Applicant: The Florida International University Board of Trustees, Miami, FL (US)

(72) Inventors: Carlos Riera Cercado, Miami, FL (US); Markondeyaraj Pulugurtha, Miami, FL (US); Juan Camilo Gomez, Miami, FL (US); Veeru Jaiswal, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 18/629,524

(22) Filed: Apr. 8, 2024

(65) Prior Publication Data

US 2024/0258012 A1 Aug. 1, 2024

Related U.S. Application Data

(63) Continuation of application No. 17/807,567, filed on Jun. 17, 2022, now Pat. No. 11,955,268.

(51) Int. Cl.

| | |
|---|---|
| ***H01F 27/28*** | (2006.01) |
| ***H01F 3/02*** | (2006.01) |
| ***H01F 27/245*** | (2006.01) |

(52) U.S. Cl.

CPC ............. *H01F 27/245* (2013.01); *H01F 3/02* (2013.01); *H01F 27/28* (2013.01)

(58) Field of Classification Search

CPC .......... H01F 27/245; H01F 3/02; H01F 27/28; H01F 3/10

See application file for complete search history.

(56) References Cited

U.S. PATENT DOCUMENTS

| | | | | |
|---|---|---|---|---|
| 7,504,924 | B2 * | 3/2009 | Inoue | H01F 3/04 336/234 |
| 7,884,696 | B2 * | 2/2011 | Hebert | H01F 17/062 336/200 |
| 2007/0175545 | A1 | 8/2007 | Urata et al. | |
| 2012/0262265 | A1 * | 10/2012 | Lo | H01F 41/026 336/83 |
| 2014/0347157 | A1 | 11/2014 | Pulugurtha et al. | |
| 2021/0036095 | A1 | 2/2021 | Pulugurtha et al. | |

FOREIGN PATENT DOCUMENTS

| | | | | |
|---|---|---|---|---|
| CN | 102893345 A * | 1/2013 | | H01F 5/003 |
| JP | 2004319875 | 11/2004 | | |
| JP | 2004356468 | 12/2004 | | |
| JP | 2005019511 | 1/2005 | | |
| JP | 4157203 | 10/2008 | | |
| JP | 2012043971 | 3/2012 | | |
| WO | 00/43556 | 7/2000 | | |

* cited by examiner

*Primary Examiner* — Tuyen T Nguyen

(74) *Attorney, Agent, or Firm* — SALIWANCHIK, LLOYD & EISENSCHENK

(57) ABSTRACT

Stacked magnetic cores that can achieve high density with a small footprint are provided. A stacked magnetic core can include a plurality of magnetic films with an adhesive film between each magnetic film and the adjacent magnetic film(s). That is, the magnetic films and adhesive films can be disposed in an alternating fashion. Each adhesive film can be a dielectric/insulating film such that each magnetic film is electrically insulated from every other magnetic film.

16 Claims, 35 Drawing Sheets

| | |
|---|---|
| Temperature | 18-25 |
| Current Density | 13 mA/cm2 |
| pH | 2.45-2.80 |
| | |
| Chemicals | Concentration g/l |
| CoSO4 · 7H2O | 15-20 |
| NiSO4 6H20 | 20-24 |
| FeSO47H20 | 20-24 |
| NH4Cl | 20-24 |
| H3BO3 | 20-25 |
| Dodecylsulfate sodium | 0.01-0.05 |
| C7H4NNaO3S | 1-2 |

FIG. 4

- Spiral Inductors were designed to meet these criteria.
- Magnetic cores on both sides sandwiching a copper winding.
- Airgap/dielectric isolation for current handling

Spacing between winding and core: 3-8 microns
Copper Thickness: 25 um.

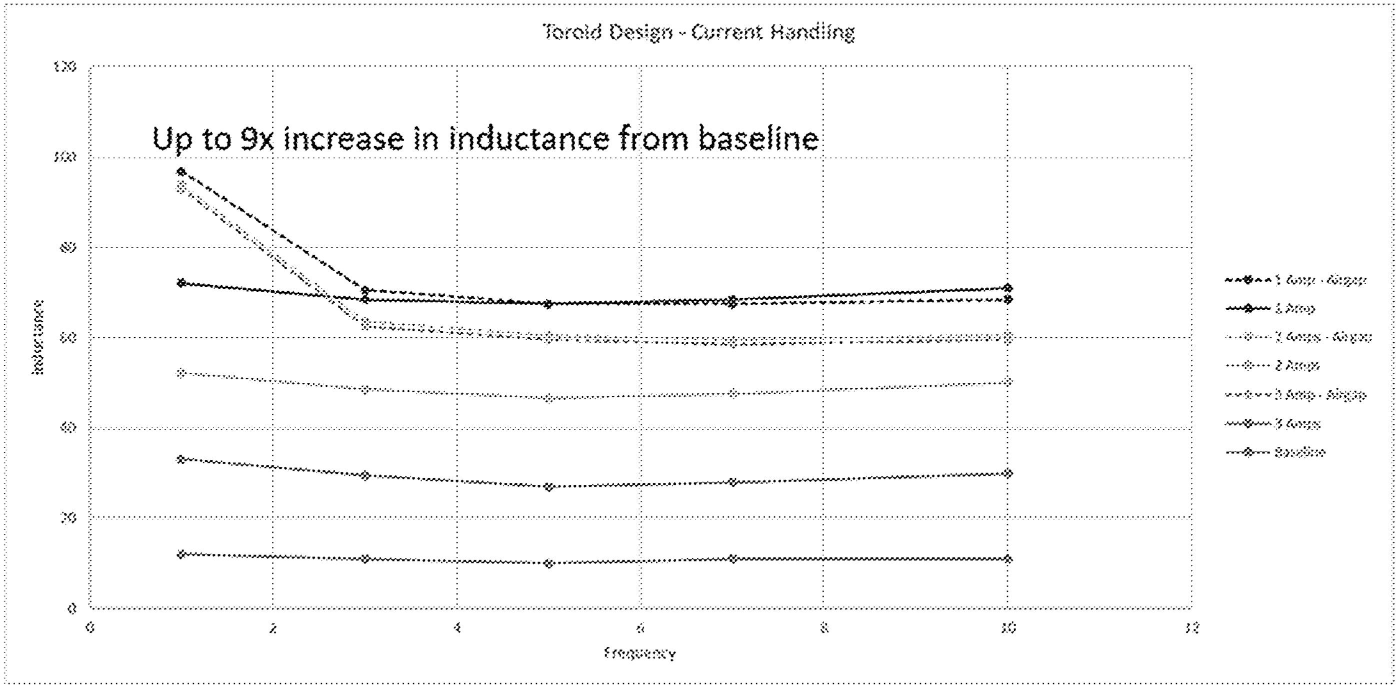

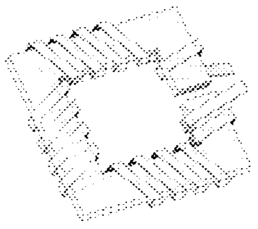

Toroid Design with airgap

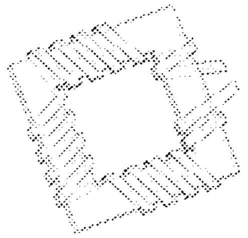

Toroid Design with NO airgap

- Introducing an air gap increases the magnetic reluctance, which reduces the effective permeability and allows the core to withstand higher DC current before reaching saturation.
- The in-plane toroid design with an air gap achieves up to a 9× increase in inductance after wrapping the coil around the magnetic material.

FIG. 29

| | Ferrites | Amorphous or nanocrystalline ribbons | Sputtered nanomagnetic films | Magnetic flake composites | Future |
|---|---|---|---|---|---|
| Permeability | >1000 | >1000 | 500-800 | 100-150<br>(1-20 MHz)<br><br>10-20<br>(100 MHz) | 800-1000 |
| Saturation magnetization | 0.5 T | 1.5 – 2 T | 1.5 T | 0.9 T | 1.5-2 T |
| Coercivity | <0.1 Oe | < 0.1 Oe | <0.1 Oe | 1-3 Oe | <0.1 Oe |
| Frequency stability | <1 MHz | < 100 kHz | >100 kHz | 10-20 MHz | >100 MHz |
| Thickness Scalability at LOW COST | Not a wafer or package compatible process | 100s of microns | <10 microns | | 5-100 microns |

FIG. 30

| | 2 layers | 4 layers | 8 layers |
|---|---|---|---|
| Area [mm2] | 14.8x10.5 | 13.4x13.4 | 9.6x16.8 |
| Thickness [mm] | 160 | 100 | 340 |
| Composition | 40mm LCP<br>5mm CoNiFe<br>115mm dielectric gel | 40mm LCP<br>10mm CoNiFe<br>50 mm dielectric gel | 40mm LCP<br>20mm CoNiFe<br>280 mm dielectric gel |
| Permeability of film (Thickness: 2.5) | | 4 layers:<br>8500/20: 425 | 8 layers:<br>9000/20= 450 |
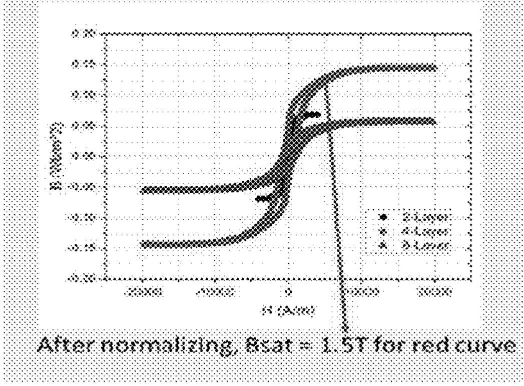
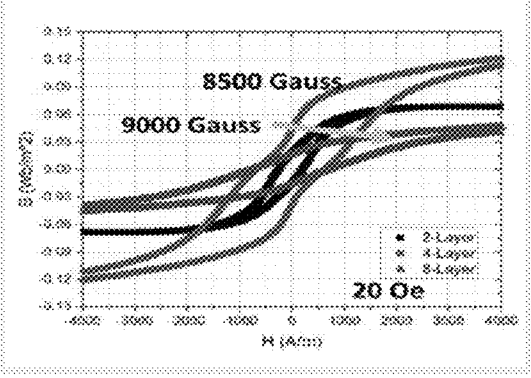
FIG. 31

| 2.5-3 μm thickness of plated alloy film Silicone thickness: 5 – 7.8 μm: | 4 layers | 8 layers | 16 layers |
|---|---|---|---|
| Area [mm2] | 22x17 | 15x13 | 15x14 |
| Thickness [mm] | 90 | 140 | 330 |
| Composition | 40mm LCP<br>10 mm NiFe<br>40mm dielectric gel<br>Each layer: (40/(4+4)): 5 mm | 40mm LCP<br>20mm NiFe<br>80 mm dielectric gel<br>Each layer: (90/(8+8)): 5.7 mm | 40mm LCP<br>40mm NiFe<br>250 mm dielectric gel<br>Each layer is (250/(16+16)): 7.8 mm |
| | | | |
|---|---|---|---|
| Permeability of film (Thickness: 2.5 – 3 mm): | 4 layers: 7000/6.5 = 1000 | 8 layers: 3500/6.5 = 538 | • 16 layers: 6200/6.5: 951 |
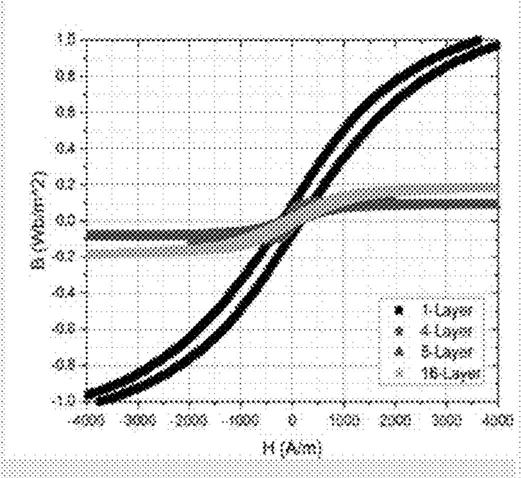
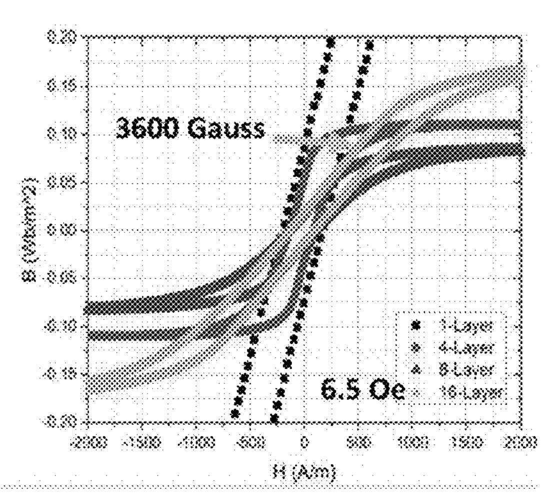
FIG. 32

| | Structure 1 | Structure 2 | Structure 3 |
|---|---|---|---|
| **Core** | Air-core /LCP | Commercial material | CoNiFe multilayered material |
| **Core size** | 5 mm * 2 mm | 5 mm * 2 mm | 5 mm * 2 mm |
| **Core thickness** | 40 µm | 220 µm | 80 µm |
| **Solenoids – closed flux path** | | | |
| | | **Structure 2a** (Modified Structure 2) | **Structure 3a** (Modified Structure 3) |
| **Core** | | Commercial material | CoNiFe multilayered material |
| **Extra layers for closing path** | | Commercial material | Commercial material |
| **Core size** | | 5 mm * 2 mm | 5 mm * 2 mm |

FIG. 33

| | Structure 4 | Structure 5 | Structure 6 | Structure 7 |
|---|---|---|---|---|
| **Core** | Commercial material with no magnetic paste | Commercial material with magnetic paste | CoNiFe multilayered material with no magnetic paste | CoNiFe multilayered material with magnetic paste |
| **Spiral Size** | 3 mm * 3 mm | 3 mm * 3 mm | 3 mm * 3 mm | 3 mm * 3 mm |

FIG. 34

| | Structure 4 | Structure 5 |
|---|---|---|
| **Core** | Commercial material with no magnetic paste | Commercial material with magnetic paste |
| **X factor** | X 3.18 | X 5.01 |

FIG. 35

| | **Structure 1** | **Structure with aigrap** |
|---|---|---|
| **Core** | Toroid with no airgap | |
| **X factor** | X 8X | 6-7X |
| **Current Density** | < 3A/10 mm$^2$ | 10 A/10 mm$^2$ |

FIG. 36

| | **Structure 1** | **Structure 2** | **Structure 3** |
|---|---|---|---|
| **Core** | Air-core /LCP | Commercial material | CoNiFe multilayered material |
| **X factor** | X 1 | X 4.80 | X 5.90 |
| **Solenoids – closed flux path** | | | |
| | | **Structure 2a** (Modified Structure 2) | **Structure 3a** (Modified Structure 3) |
| **Core** | | Commercial material | CoNiFe multilayered material |
| **Extra layers for closing path** | | Commercial material | Commercial material |
| **X factor** | X 1 | X 11.8 | X 13.6 |
| **Current Density** | | | 10 A/10 mm$^2$ |

FIG. 37

STACKED MAGNETIC CORES HAVING SMALL FOOTPRINTS

CROSS-REFERENCE TO RELATED APPLICATION

The present application is a continuation application of U.S. application Ser. No. 17/807,567, filed Jun. 17, 2022, which will issue as U.S. Pat. No. 11,955,268 on Apr. 9, 2024, the disclosure of which is hereby incorporated by reference in its entirety, including all figures, tables, and drawings.

BACKGROUND

Magnetic power components have a total addressable market of over $20 billion. They impact the progress in the multi-trillion dollar electronics industry because power delivery and efficiency limits the performance of future electronic systems. A key to advancing this massive market is the development of magnetic components with high power density and efficiency that can be fabricated with scalable processes at low cost.

BRIEF SUMMARY

Embodiments of the subject invention provide novel and advantageous stacked magnetic cores (e.g., for inductors and transformers) that can achieve high density with smaller lateral dimensions (or footprint), as well as methods of fabricating and using the same. A stacked magnetic core can include a plurality of magnetic films with an adhesive film between each magnetic film and the adjacent magnetic film(s). That is, the magnetic films and adhesive films are disposed in an alternating fashion, with a first adhesive film disposed on a first magnetic film, a second magnetic film disposed on the first adhesive film, a second adhesive film (if present) disposed on the second magnetic film, and so on (for as many magnetic films and adhesive films as are present).

In an embodiment, a stacked magnetic core for an electrical component (e.g., an inductor or a transformer) can comprise: a first magnetic film; a first adhesive film disposed on an upper surface of the first magnetic film; and a second magnetic film disposed on the first adhesive film. The first adhesive film can adhere the first magnetic film to the second magnetic film, and the first magnetic film can be electrically insulated from the second magnetic film by the first adhesive film. A footprint of the stacked magnetic core (measured in a first plane having the upper surface of the first magnetic film lying therein) can be, for example, 15 square millimeters ($mm^2$) or less (e.g., 10 $mm^2$ or less, 5 $mm^2$ or less, or 1 $mm^2$ or less). The stacked magnetic core can have an inductance density of, for example, at least 8 nanohenries per square millimeter ($nH/mm^2$) (e.g., at least 10 $nH/mm^2$). The stacked magnetic core can have a coercivity of, for example, no more than 1 Oersted (Oc). The stacked magnetic core can comprise a plurality of magnetic films and a plurality of adhesive films stacked in an alternating fashion such that each magnetic film is electrically isolated from each other magnetic film (e.g., by an adhesive film respectively disposed between each magnetic film and the magnetic film above it (or below it)). The plurality of adhesive films can comprise the first adhesive film and a second adhesive film disposed on an upper surface of the second magnetic film, and the plurality of magnetic films can comprise the first magnetic film, the second magnetic film, and a third magnetic film disposed on the second adhesive film (this pattern can continue up to any desired number of magnetic films, with an additional adhesive film provided under each new magnetic film). Each magnetic film of the plurality of magnetic films can be, for example, a cobalt-nickel-iron (CoNiFe) film. A thickness of each adhesive film (measured in a first direction perpendicular to the first plane) can be in a range of, for example, from 0.01 micrometers (μm) to 10 μm (or any subrange therein; e.g., from 0.05 μm to 5 μm, or from 0.1 μm to 1 μm). A thickness of each magnetic film (measured in the first direction perpendicular to the first plane) can be in a range of, for example, from 0.01 μm to 10 μm (or any subrange therein; e.g., from 0.1 μm to 5 μm, or from 0.5 μm to 2 μm). Each adhesive film can be (independently) a polymer adhesive film or a metal-polymer composite film. Each individual magnetic film can be monolithic.

In another embodiment, an electrical component (e.g., an inductor or a transformer) can comprise: a stacked magnetic core as disclosed herein; and a coil disposed around (e.g., wrapped around) the stacked magnetic core. The isolation between the coil and the stacked core can be a critical design parameter that determines the inductance density and current-handling trade-offs. This is one way to control the reluctance of the magnetic path. The electrical component (e.g., inductor or transformer) can have an open (magnetic) flux path or a closed (magnetic) flux path. For example, the electrical component (e.g., inductor or transformer) can further comprise a magnetic paste disposed around the coil such that the flux path of the electrical component (e.g., inductor or transformer) is closed. An isolation between the coil and the stacked core can be in a range of, for example, from 2 μm to 100 μm. A ratio between the isolation and a thickness of the stacked core can be in a range of, for example, 0.02 to 0.5. The stacked cores with the coil may also be disposed over each other while a magnetic paste can close the magnetic flux loop from one stack to another stack. In a further embodiment, the airgap and magnetic paste fill can be another way to control the reluctance. The paste permeability, stacked core permeability, cross-section, and isolation between the coil and the stacked magnetic core can provide a rich design space for achieving the target performance.

In further embodiments, the stacked core can form a toroid with or without an airgap to manage the reluctance for target current-handling and inductance density. The airgap can be filled with magnetic paste to further engineer the reluctance. The airgap length, paste permeability, stacked core permeability, cross-section, and isolation between the coil and the magnetic core can provide a rich design space for achieving the target performance.

In another embodiment, an electrical component (e.g., an inductor or a transformer) can comprise: a first stacked magnetic core as disclosed herein; a coil disposed around (e.g., wrapped around) the stacked magnetic core; a second stacked magnetic core as disclosed herein disposed above or below the first stacked magnetic core; and a magnetic paste to close the magnetic flux loop from the top to the bottom.

In another embodiment, an electrical component (e.g., an inductor or a transformer) can comprise: a stacked magnetic core as disclosed herein disposed in a closed loop (e.g., a donut or a frame); a discontinuity inside the closed loop to form an airgap; a magnetic paste disposed inside the airgap to fill it; and a coil disposed around (e.g., wrapped around) the stacked magnetic core. The electrical component can have a closed magnetic flux path with an effective reluctance in a range of, for example, 5 μm to 100 μm.

BRIEF DESCRIPTION OF DRAWINGS

FIG. 4 shows example plating conductions and electrolyte composition for electrodeposition of cobalt nickel iron (CoNiFe) thin films, according to an embodiment of the subject invention (see also, e.g., Rasmussen et al., Electroplating and characterization of cobalt-nickel-iron and nickel-iron for magnetic microsystems applications. Sensors and Actuators A: Physical, 92(1-3), 242-248, 2001; and Sverdlov et al., The electrodeposition of cobalt-nickel-iron high aspect ratio thick film structures for magnetic MEMS applications, Microelectronic engineering 76.1-4: 258-265, 2004; both of which are hereby incorporated by reference herein in their entireties).

FIG. 5(*b*) shows an image of an electroplating setup for multilayer magnetic cores, according to an embodiment of the subject invention.

FIG. 5(*c*) shows a plot of magnetic flux (in milliTesla (mT)) versus time (in seconds (s)), for the electroplating pictured in FIG. 5(*b*).

FIG. 7(*b*) shows a plot of composition (atomic percentage) versus current density (in Amps per square decimeter ($A/dm^2$)) (see also Rasmussen et al., supra.).

FIG. 14(*b*) shows inductance (in nH) versus frequency (in MHz), showing simulated inductance of air-core and magnetic-core inductors.

FIG. 19(*b*) shows an image of a spiral wrapped around a commercial magnetic material core with a closed loop using magnetic paste.

FIG. 20(*b*) shows an image of a soldered device under test (DUT) directly on a SubMiniature version A (SMA) connector.

FIG. 23(*b*) shows a plot of inductance (in nH) versus frequency (in MHz) for structure 4 and structure 5 spirals.

FIG. 25(*b*) shows a plot of inductance (in nH) versus frequency (in MHz) for structure 3*a* solenoids and an air-core solenoid.

FIG. 29 shows a plot of inductance (in nH) versus frequency (in MHz) for toroid inductors. The curves are for (from highest inductance at 10 MHz to lowest inductance at 10 MHz) 1 A, 1 A (airgap), 2 A (airgap), 3 A (airgap), 2 A, 3 A, and baseline. FIG. 29 also shows an air-core design (inset), a toroid design with an airgap (top-right), another image of the toroid design (middle-right), and a schematic of a toroid design (bottom-right). Though certain dimensions are shown in FIG. 29, these are for exemplary purposes only and should not be construed as limiting (though they were used in the example that references this figure). The airgap and filled airgap to manage reluctance are also illustrated in FIG. 29.

FIG. 30 shows a table of performance metrics of magnetic materials and a magnetic core according to an embodiment of the subject invention (in the column labeled "Future").

FIG. 31 shows a table of plated and layered magnetic composite structures and their measured BH curves.

FIG. 32 shows a table of plated and layered magnetic composite structures and their measured BH curves.

FIG. 33 shows a table of parameters for solenoid inductors (open flux path) (top portion of table) and solenoid inductors (closed flux path) (bottom portion of table).

FIG. 34 shows a table of parameters for spiral inductors.

FIG. 35 shows a table of parameters for spiral inductors.

FIG. 36 shows a table of parameters for toroid inductors.

FIG. 37 shows a table of parameters for solenoid inductors (open flux path) (top portion of table) and solenoid inductors (closed flux path) (bottom portion of table).

DETAILED DESCRIPTION

Figure 1:
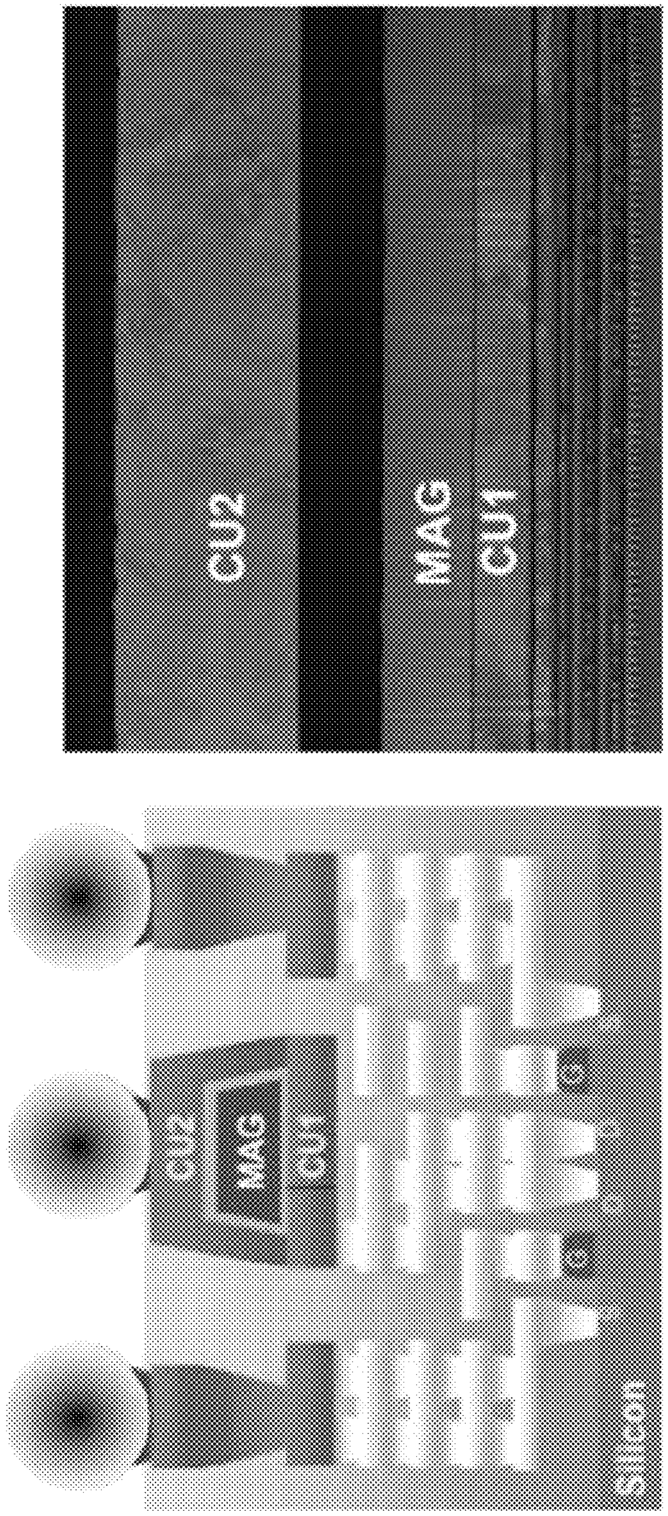
FIG. 1 shows a schematic view of magnetic inductors integrated with integrated circuits (ICs) (left) and a scanning electron microscope image of a cross-section of magnetic inductors integrated with ICs (see also, e.g., Sturcken et al., Magnetic thin-film inductors for monolithic integration with CMOS, in 2015 IEEE International Electron Devices Meeting (IEDM), pp. 11.4.1-11.4.4, 2015; which is hereby incorporated by reference herein in its entirety).

Embodiments of the subject invention provide novel and advantageous stacked magnetic cores (e.g., for inductors and transformers) that can achieve high density with smaller lateral dimensions (or footprint), as well as methods of fabricating and using the same. A stacked magnetic core can include a plurality of magnetic films with an adhesive film between each magnetic film and the adjacent magnetic film(s), and the adhesive films can adhere adjacent magnetic films to each other. That is, the magnetic films and adhesive films are disposed in an alternating fashion, with a first adhesive film disposed on a first magnetic film, a second magnetic film disposed on the first adhesive film, a second adhesive film (if present) disposed on the second magnetic film, and so on (for as many magnetic films and adhesive films as are present). The adhesive films can be dielectric/insulating films and can keep the magnetic films completely electrically isolated from each other, while also adhering adjacent magnetic films to each other. Each magnetic film can have a thickness of, for example, 0.1 micrometers (μm)-5 μm (e.g., 0.5 μm-2 μm), and each adhesive film can have a thickness of, for example, 0.05 μm-5 μm (e.g., 0.1 μm-1 μm). The footprint of the stacked magnetic core (i.e., the lateral area taken in a plane perpendicular to the thickness direction) can be, for example, less than 15 square millimeters (mm$^2$) (e.g., less than 10 mm$^2$, less than 5 mm$^2$, less than 3 mm$^2$, less than 2 mm$^2$, or less than 1 mm$^2$). The, or each, magnetic film can be, for example, an alloy of nickel (Ni), iron (Fc), and/or cobalt (Co) (e.g., CoNiFe), though embodiments are not limited thereto. The, or each, adhesive film can be, for example, a polymer adhesive or a metal-polymer composite adhesive, though embodiments are not limited thereto. An electrical component (e.g., an inductor or a transformer) can comprise the stacked magnet core as its core, and such an electrical component can further comprise a coil, one or more backing layers, one or more vias, or other elements necessary to complete the electrical component. The electrical component can be configured to have a closed flux path.

Closed magnetic loops are required to achieve high density in inductors and transformers. Magnetic cores need to be formed in a closed loop to achieve low reluctance for high density, and this is also critical to achieve efficiency. Embodiments of the subject invention provide structures that can form such closed loops with smaller footprints (or lateral dimensions) compared to related art devices. Methods are also provided to achieve such structures by laminating magnetic cores with thin adhesive layers. The structures include stacked magnetic cores that achieve high density with a decreased footprint compared to related art devices.

Toroid inductor structures are widely used for high inductance densities, high current handling, and high efficiency, which are three key parameters for future inductor markets. In order to form the toroids, closed loop in-plane magnetic cores are typically used. This, however, leads to a large footprint or lateral size in related art devices. Embodiments of the subject invention address this problem by providing stacked solenoid cores (or magnetic cores) with a combination of magnetic layers (or multilayers) and magnetic paste adhesives to form toroids with a smaller footprint. The devices do not even result in a significant increase in thickness even though the cores are stacked. This is because of the unique magnetic film multilayers that are utilized to achieve high permeability and lower reluctance. With magnetic multilayers with a thickness in a range of, for example, 0.5 μm-2 μm that are isolated with thin insulators (with thickness in a range of for example, 0.1 μm-1 μm), high permeability and saturation magnetization can be achieved with smaller footprints than related art devices. Devices of embodiments of the subject invention can have an inductance density of, for example, at least 8 nanohenries per square millimeter (nH/mm$^2$) (e.g., at least 8 nH/mm$^2$ or at least 10 nH/mm$^2$) and a current density of at least 0.8 Amps per square millimeter (A/mm$^2$) (e.g., at least 1 A/mm$^2$).

Embodiments of the subject invention can also provide an additional degree of freedom in enhancing the current-handling. This can be done by choosing the magnetic paste adhesives to have the required field anisotropy to achieve high current handling. This can balance the inductance density and current handling.

The layers (e.g., layers of the magnetic core(s) and/or the adhesive layers) can be fabricated separately, and they can then be aligned and laminated so that the process steps are minimized for a lower cost of fabrication. The lamination can integrate copper windings with the toroid structures in a single process step.

An important innovation is that the magnetic layers can be electroplated with a predetermined (designed) composition and/or nanostructure. Electroplating is a scalable synthesis approach to deposit microscale thick films with nanocrystalline or amorphous structure on a carrier. Two additional innovations are used to achieve the target nanostructure and resulting properties. By depositing under a magnetic field, the film coercivity in the hard axis of the device can be substantially reduced while also enhancing the current-handling. A uniform unidirectional magnetic field can be applied to the working electrode (cathode). This creates an in situ magnetic orientation to achieve high field anisotropy and low coercivity in the hard axis. Both these attributes are extremely important in achieving high power density with high efficiencies. The permanent field can be created by, for example, surrounding a plating carrier with a frame (e.g., a rectangular frame) comprising hard magnets and soft magnets. Two parallel sides can each have a hard magnet with the same North-South (N-S) orientation as each other. The other two sides, which are also parallel to each other, can be made of soft magnets (e.g., soft stainless steel magnets). This approach is highly effective in creating a uniform magnetic field around the working sample. In an embodiment, a cobalt nickel iron (CoNiFe) alloy can be used as the base magnetic material because of its high saturation magnetization (greater than 2.0 Tesla (T)).

Next, the interlayered magnetic films (e.g., CoNiFe films) and one or more dielectric layers (i.e., adhesive layers) can be built to create a structure that can be placed around, above, and/or below the inductors. The adhesive layer(s) can serve two functions—first, the adhesive layer(s) can provide strong adhesion to the electroplated magnetic film (e.g., CoNiFe film) so that it can be easily delaminated out (e.g., out of the titanium); and second, the adhesive layer(s) can act as an interlayer dielectric that isolates the plated magnetic films in the final multilayered core. The adhesive can be durable and fast curing, require no primer, and have good mechanical strength. The curing time can be short (e.g., 2-3 minutes or less at 100° C.). In order to spread the adhesive properly, a spin coating technique can be used. The thickness control of the adhesive can also be optimized in the spin coating. A uniform (or nearly uniform) spread of almost 1 μm (e.g., about 1 μm or about 0.9 μm) thickness of adhesive can be obtained between the two layers of magnetic film. After curing, the adhesion strength is adequate for subsequent film-transfer steps.

In order to achieve high inductance, it is important to provide a low-reluctance magnetic loop path, while also providing more turns. The stacked core can form a donut or rectangular frame toroid structure for low reluctance magnetic loop and achieve higher inductance. However, if the reluctance is too low, current-handling is affected. Therefore, discontinuities can be introduced into the magnetic loop to create an airgap. The discontinuity(ies) can then be back-filled with magnetic paste with moderate reluctance to give an ideal or advantageous trade-off between inductance and current-handling. The combination of a multilayered stacked core for high permeability (low reluctance) and filled airgap with magnetic paste (for low reluctance) provides a unique design space for embodiments of the subject invention. This is illustrated in FIG. 29. In an alternative approach, the stacked cores can further be vertically disposed onto each other, while closing the gap from one stacked core to the other (e.g., the or each adjacent core(s)) with a magnetic paste. This also gives a good balance between inductance and current-handling. Though, disposing one stacked core above the other increases the thickness of the core. On the other hand, if the stacked core forms a horizontal donut loop like a toroid, it can increase the footprint.

Figure 6:
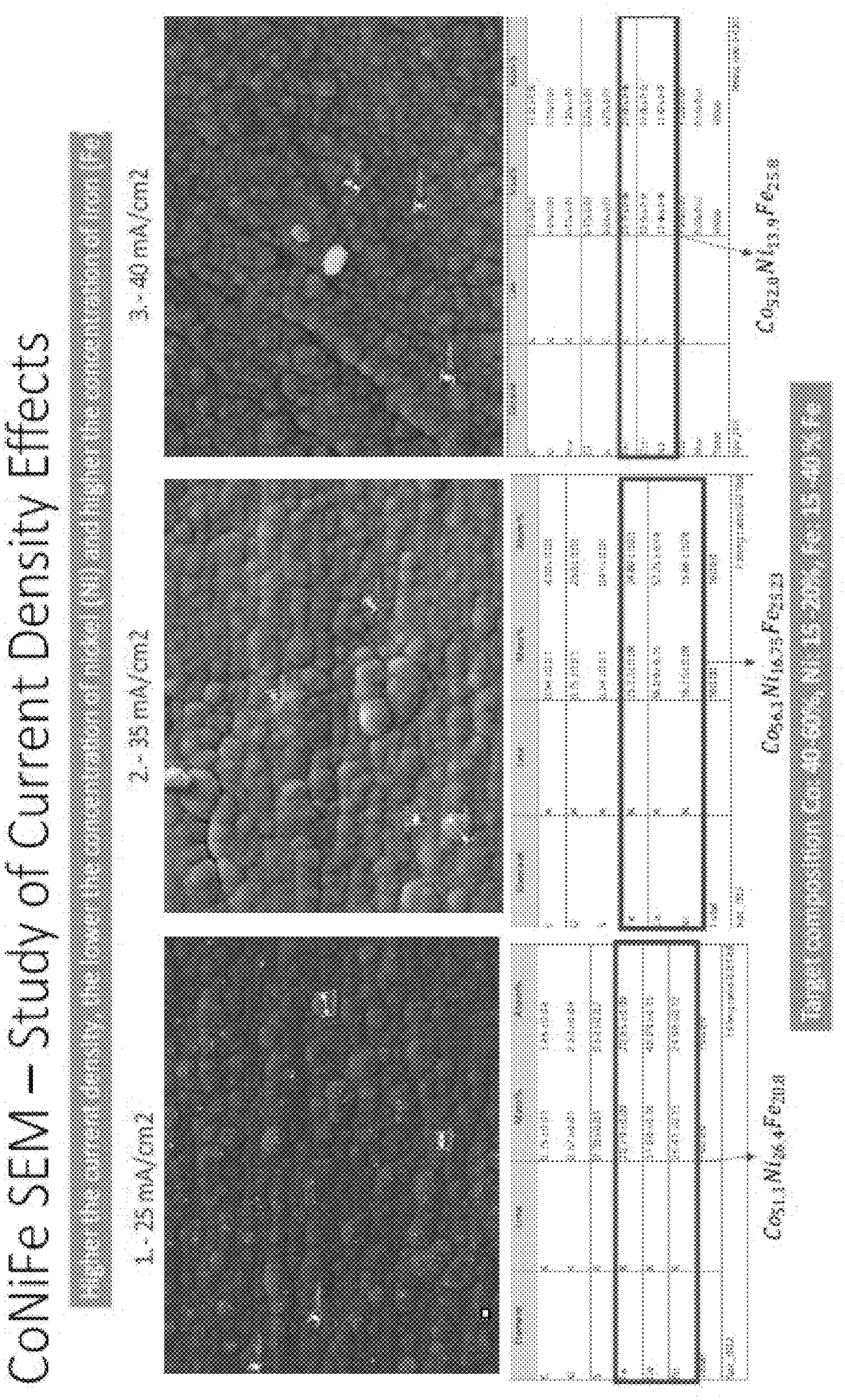
FIG. 6 shows SEM images of CoNiFe magnetic thin films. The scale bar (image on left) is 1 micrometer (μm).

In some embodiments, stacked closed-flux path solenoid designs can be utilized because of their higher inductance and current-handling capacity. Solenoids with closed flux path have windings on a core, and the periphery is enclosed with extra layers of material for creating a closed magnetic circuit. The coils can be isolated from the stacked magnetic cores with, for example, polymer isolation. This isolation (or width, w) can be a key design parameter, as illustrated in FIG. 6. The stacked core thickness (t) can vary from, for example, 1 micron (μm) to 50 μm while the ratio (w/t) of the isolation to the stacked core thickness can vary from, for example, 0.02 to 0.5. Various solenoid designs can be used and can achieve high-current handling and high inductance density. The high-permeability multilayered structures can be used to form the magnetic cores, and stacking can be achieved with, for example, polymer adhesives or magnetic metal-polymer composite adhesives as the cores for inductor designs. Modified solenoids structures with a closed magnetic circuit show high inductance (more than 10 times (×10)) compared to their corresponding solenoids with an open flux path. A current-handling capacity of at least 3 Amps (A) can be achieved with a footprint of 1 square millimeter ($mm^2$) or less (i.e., a current density of 3 $A/mm^2$).

Embodiments can provide ultra-thin electrical components (e.g., inductors or transformers) with a permeability of, for example, 300-400 at a frequency of 10 megahertz (MHz). An inductance density of, for example 8 $nH/mm^2$ or more can be achieved with, e.g., 5-10 milliohms (mΩ) of resistance at a frequency of 1 MHz to 10 MHz. Current handling of at least 1 $A/mm^2$ can be achieved.

Advanced composite magnetic structures with high permeability, low coercivity, high resistivity, and good frequency stability are needed to achieve the best inductor performance metrics. A key metric is $L/R_{dc}$ (an inductance density of 8 $nH/mm^2$ or more (e.g., 8-15 $nH/mm^2$) with 10 mΩ direct current (DC) resistance at about 10 MHZ). In addition, thickness scalability with innovative inductor topologies is important for handling adequate power at low cost. These attributes come at the expense of each other, and existing approaches face fundamental limitations either in terms of performance, scalability to high power, or cost. Ferrites have been widely used as the magnetic cores for low frequency applications such as transformers. Ferrites have low saturation magnetization and are not suitable for high-current handling and high-frequency applications (due to high-frequency instability above 3 MHZ). The ceramic properties of ferrites provide high resistivity (>1 Ohms-meters (Ω-m)) resulting in low eddy current loss for thicker cores. However, the low field anisotropy (Hk) of ferrites limits them to low-frequency applications (about 1 MHZ). Ferrites also have low saturation magnetization (about 0.5 T or less) and low permeability (μ), which lead to low inductance volumetric density and low current handling when used as the inductor cores.

Nanocrystalline magnetic ribbon alloys (e.g., Metglas® from Hitachi®) show good soft magnetic properties such as low coercivity, low core loss, and high permeability. The good soft magnetic properties are the results of absence of grain boundaries and crystal magnetic anisotropy in amorphous alloys. Another example is VITROPERM®, an iron-based nanocrystalline material with soft-magnetic properties of high saturation flux density (greater than or equal to 1.2 T), a permeability that can be adjusted in the range of from 400 to 800,000, excellent thermal stability over a wide temperature range, low core losses and low coercivity, and low or zero saturation magnetostriction. VITROPERM products are available as ribbon in thicknesses from 14 μm to 20 μm and widths from 2 millimeters (mm) to 66 mm. Because of their high eddy currents, they are more suitable for lower frequencies as transformer cores and common mode chokes. The magnetic fields of a toroid are directed within the plane of the core, and the eddy currents are orthogonal to the plane, so aligned magnetic flakes can be used as magnetic materials.

Figure 2:
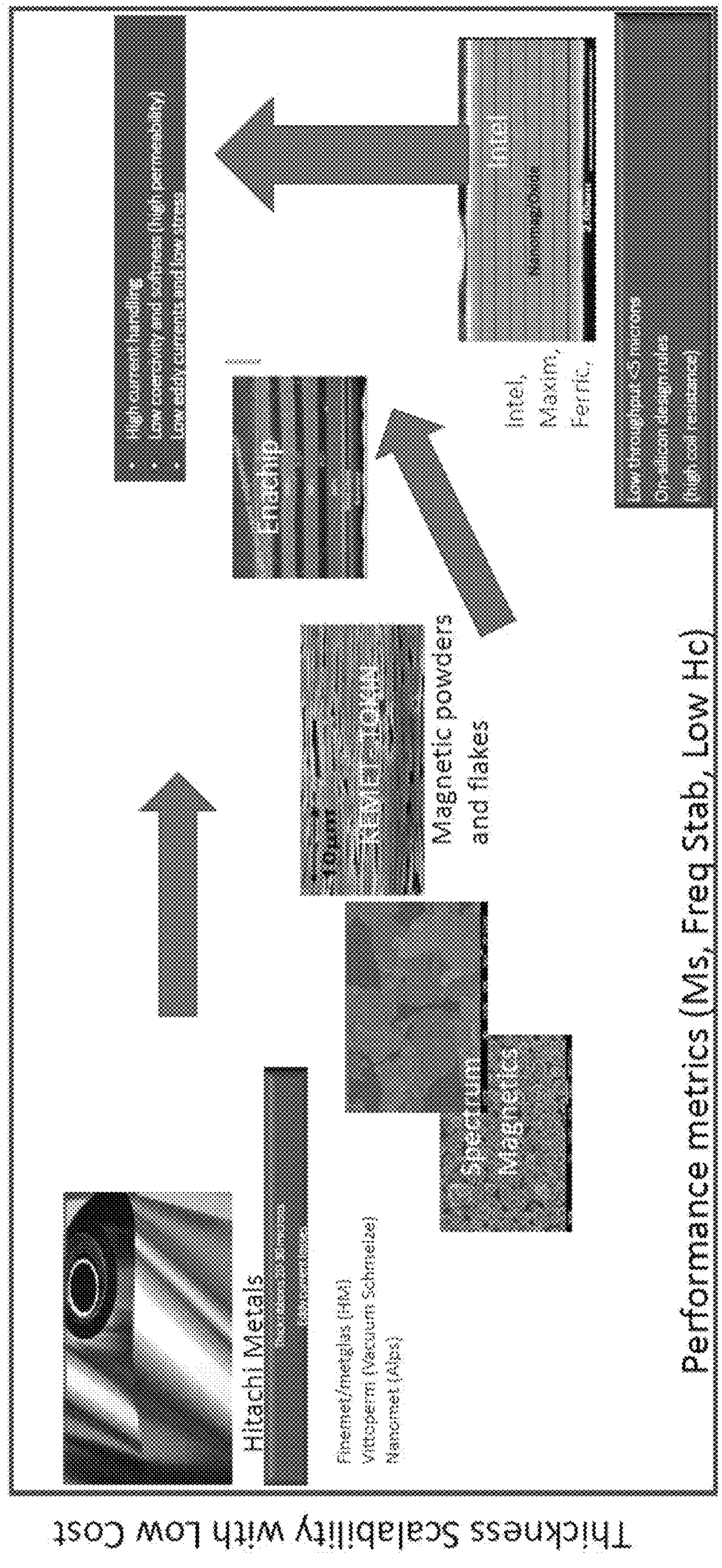
FIG. 2 shows nanomagnetic films according to an embodiment of the subject invention.

High permeability and softness (low coercivity) with frequency stability (high resistivity for low eddy currents and high ferromagnetic resonance (FMR)) requires nano-structured cobalt and iron alloys (less than 5 nanometers (nm)) with interspersed oxides (less than 5 nm) to enable exchange coupling and electrical isolation. Such "meta-stable" structures can be deposited with sputtering techniques, but these are unfortunately limited to lower film thickness and low-throughput processes (see also, e.g., Gardner et al., Integrated on-chip inductors using magnetic material (invited), Journal of Applied Physics, vol. 103, p. 07E927, 2008; which is hereby incorporated by reference herein in its entirety). Magnetic thin-film inductors can be integrated into integrated circuits (ICs), as depicted in FIG. 1. Composite processing with advanced flakes can achieve structures like sputtering, but the resulting devices are limited to permeabilities of less than 150-200 and lower Ms. Embodiments of the subject invention can achieve a nano-structure with a scalable and thick film package-compatible process, providing unparalleled opportunities for enhancing the efficiency and current-handling at the same time. FIG. 2 shows a scalable fabrication approach for nanomagnetic films, according to an embodiment of the subject invention. Such a scalable approach to achieve metastable nanostructures can achieve 10× improvement in properties and performance compared to polymer composite films and air-core inductors, which are the primary related art options for package-compatible inductors. Unlike polymer composite inductors with magnetic particles, the nanomagnetic films do not undergo demagnetization that can degrade permeability and coercivity.

Figure 3:
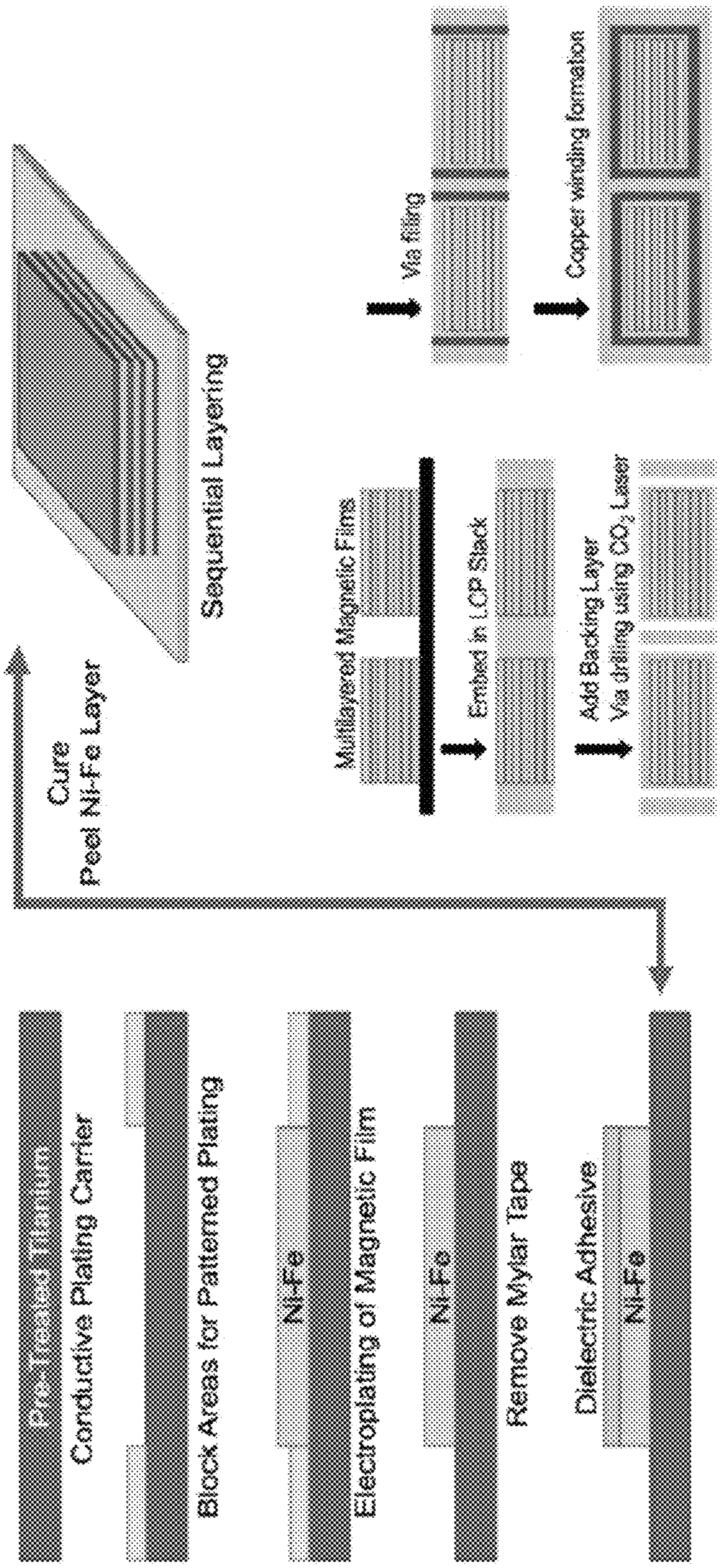
FIG. 3 shows a process flow for fabricating inductor cores and inductors, according to an embodiment of the subject invention.

Embodiments provide plated magnetic composite films to achieve both high Ms, high permeability, and low coercivity. Nanomagnetic films can be deposited with precise control in composition and nanostructure by a continuous electroplating process. CoNiFe alloys (e.g., doped CoNiFe alloys) can achieve Ms of at least 2.0 T. Monolithic magnetic films will quickly run into losses from eddy currents, process issues from stresses, and delamination and other reliability challenges. A key innovation is to intersperse the magnetic films with thin insulating and/or adhesive layers (e.g., polymers) in an automated process to relieve both the eddy currents and stresses. The insulating layers can suppress the eddy currents and coupling between the layers that could otherwise increase the coercivity. Thin films (e.g., 2 μm or less) can be electroplated and then easily released from the carrier to form a layered composite structure by utilizing thin insulating adhesives. By interspersing with thin insulators, a permeability of 800-1000 with a coercivity of less than 1 Oersted (Oe) can be achieved with frequency stability of 100 MHz and beyond, and alternative current (AC) losses of less than 1%. The films can be deposited onto thick carriers with direct in situ patterning without the need for any subsequent lithographic steps to pattern them. That is, the fabrication method can explicitly exclude such subsequent lithographic steps. These micropatterned films can be transferred onto laminates as adhesive-isolated nanomagnetic layers. A high throughput batch process can be used for high throughput and low cost. Standard package processes can be utilized to form solenoid and/or spiral inductors after fabricating the multilayer magnetic cores. Solenoids can provide high current handling, and spiral inductors can provide low DC resistance. FIG. 3 shows a process flow for inductor integration. These powder inductors can achieve high inductance and high saturation current while retaining a small size. The low thickness profile enables them to be embedded into substrates and provide high power densities. The table in FIG. 30 shows properties of inductors of embodiments of the subject invention (in the column labeled "future"), compared to inductors using other types of magnetic materials.

A CoNiFe alloy can be used as the base magnetic material because of its high saturation magnetization (greater than 2.0 T). CoNiFe layers can be electroplated with a predetermined (e.g., designed) composition and nanostructure. Suitable additives can be used to help achieve nanostructure and lower the coercivity, while increasing the alloy resistivity. Alloying with additives allows retention of the amorphous structure with low magnetostriction. Example additives are silicon (Si), aluminum (Al), zirconium (Zr), tantalum (Ta), and hafnium (Hf), which unfortunately have reduction potential. Plating these additives is not possible under standard aqueous acid plating conditions. In this scenario, a soft magnetic material like CoNiFe is a very promising material for magnetic microsystems. Thus, embodiments can exclude any such additives, which may diminish the magnetic material's properties, and instead just use a soft magnetic material like CoNiFe.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

Figure 5A:
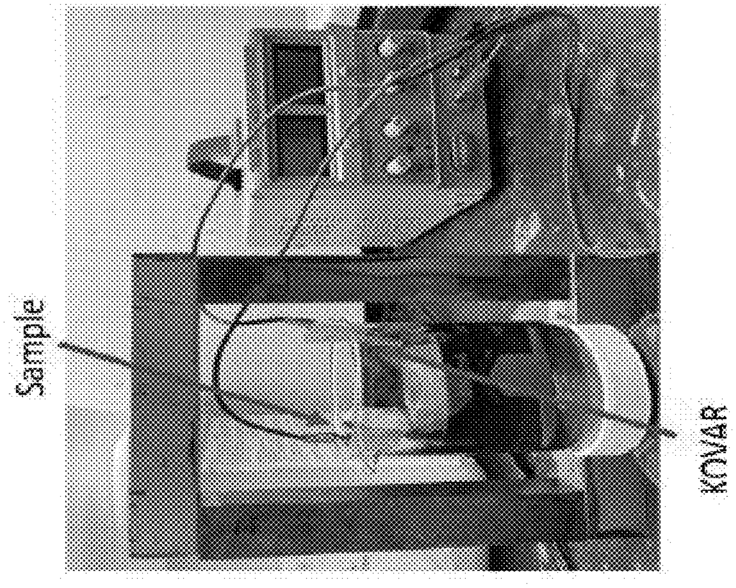
FIG. 5(*a*) shows an image of an electroplating setup for multilayer magnetic cores, according to an embodiment of the subject invention.
Figure 5B:
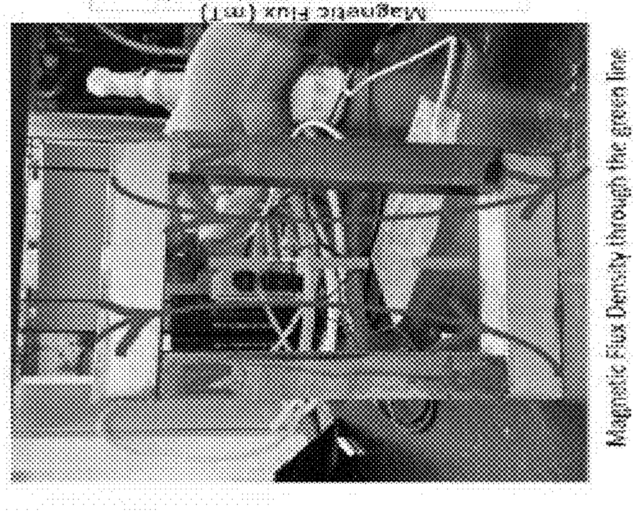
Figure 5C:
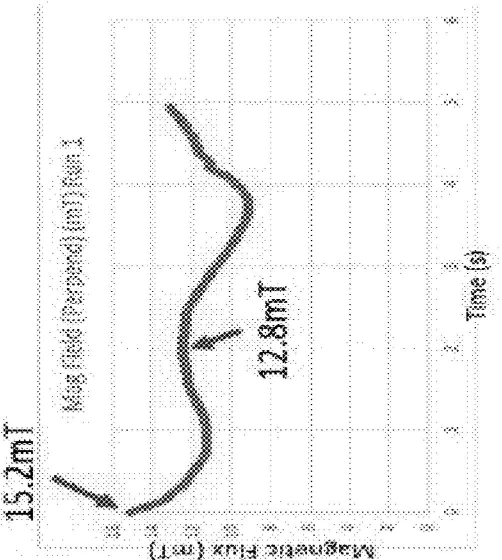

A stable plating bath that can yield the desired films can be used for fabricating a multilayered inductor core. The concentration of metal ions in the bath determines the final alloy composition. It is critical to stabilize the bath to prevent or inhibit the oxidation of $Fe^{2+}$ to $Fe^{3+}$ and prevent or inhibit hydroxide precipitation and suppress the evolution of hydrogen at the cathode. FIG. 4 shows plating conditions and electrolyte composition for the electrodeposition of CoNiFe thin films. By depositing under magnetic field, the film coercivity in the hard axis can be substantially reduced while also enhancing the current-handling. A uniform unidirectional magnetic field can be applied to the working electrode (cathode), as shown in FIGS. 5(*a*) and 5(*b*). This creates in situ magnetic orientation to achieve high field anisotropy and low coercivity in the hard axis. Both these attributes are extremely important in achieving high power density with high efficiencies. FIG. 5(*c*) shows a plot of magnetic flux (in milliTesla (mT)) versus time. The permanent field can be created by surrounding the plating carrier with a frame (e.g., a rectangular frame) comprising hard magnets and soft magnets. Two parallel sides (e.g., the long sides or the vertical sides) can have hard magnets with the same N-S orientation. The other two sides (e.g., the short sides or the horizontal sides) can be made of soft magnets (e.g., stainless steel magnets). This approach is highly effective in creating a uniform magnetic field around the working sample.

The current density can be optimized. The electroplating process was optimized such that when apply 35 milliamps per square centimeter ($mA/cm^2$) was applied for about 4 minutes and 30 seconds, a film with a thickness of 2 μm (or about 2 μm) was achieved. The thickness of the film was confirmed using a profilometer. FIG. 6 shows scanning electron microscope (SEM) images of the CoNiFe layers, revealing that more uniform electroplating and direction of grains was obtained by electroplating the sample under the unidirectional magnetic field and using a current density of 35 $mA/cm^2$. Higher current density promotes higher deposition of Fe instead of Ni.

Figure 7A:
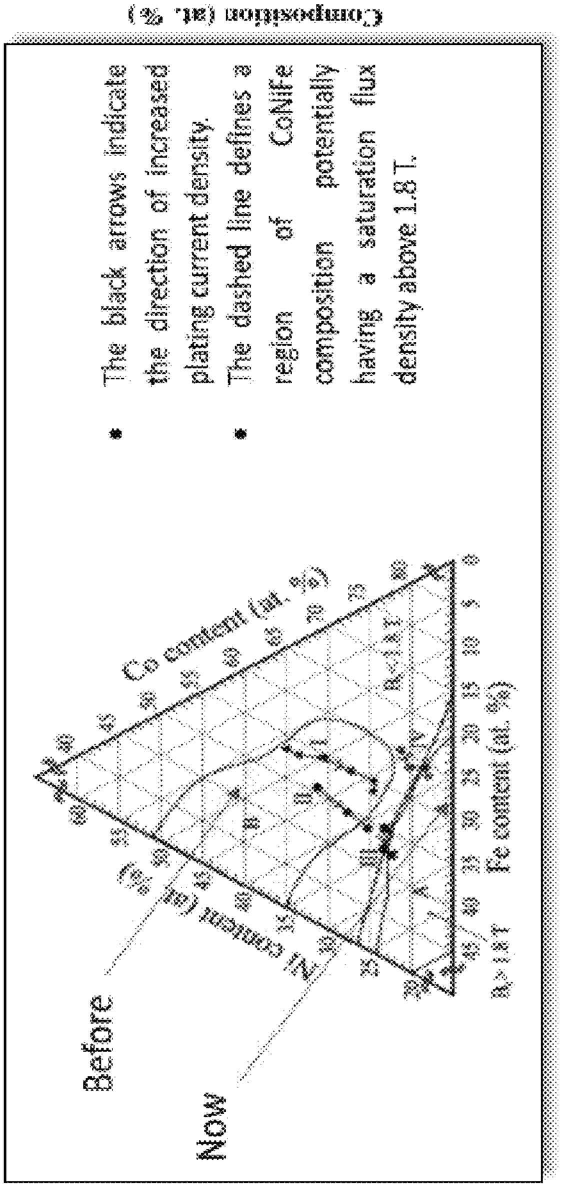
FIG. 7(*a*) shows a three-element plot of the composition of CoNiFe (see also Rasmussen et al., supra.).
Figure 7B:
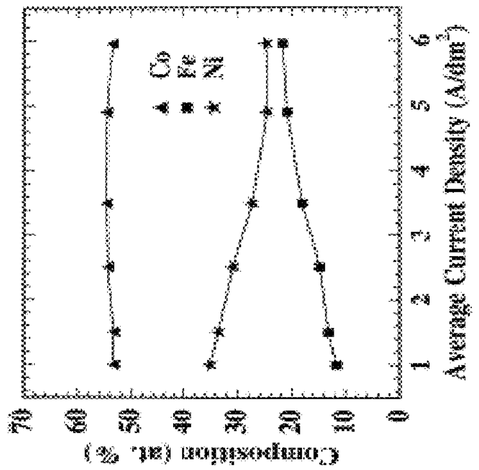

FIGS. 7(*a*) and 7(*b*) show three element plots of the composition of the CoNiFe layers as a function of current density. FIG. 6 relates to FIGS. 7(*a*) and 7(*b*) due to the strong dependence of the composition of the CoNiFe alloy on current density during the electroplating process. With controlled composition of Co, Fe, and Ni the desired nanocrystalline films can be achieved with high permeability. The Co content does not change much (40%-65%) as a function of current density. However, it plays an important role in deciding the content of Fe and Ni in the film. When the current density is enhanced, Fe content increases with a corresponding decrease in Ni content. Similarly, with high Fe content as compared to Ni content (low), saturation flux density (Bs) can be enhanced. In FIG. 7(*a*), the three-element plot shows how it is attempted to move from position B towards A. Position B had a saturation magnetization flux around 1.5 T while position A had a saturation flux of 1.8 T or more.

Example 2

Figure 8:
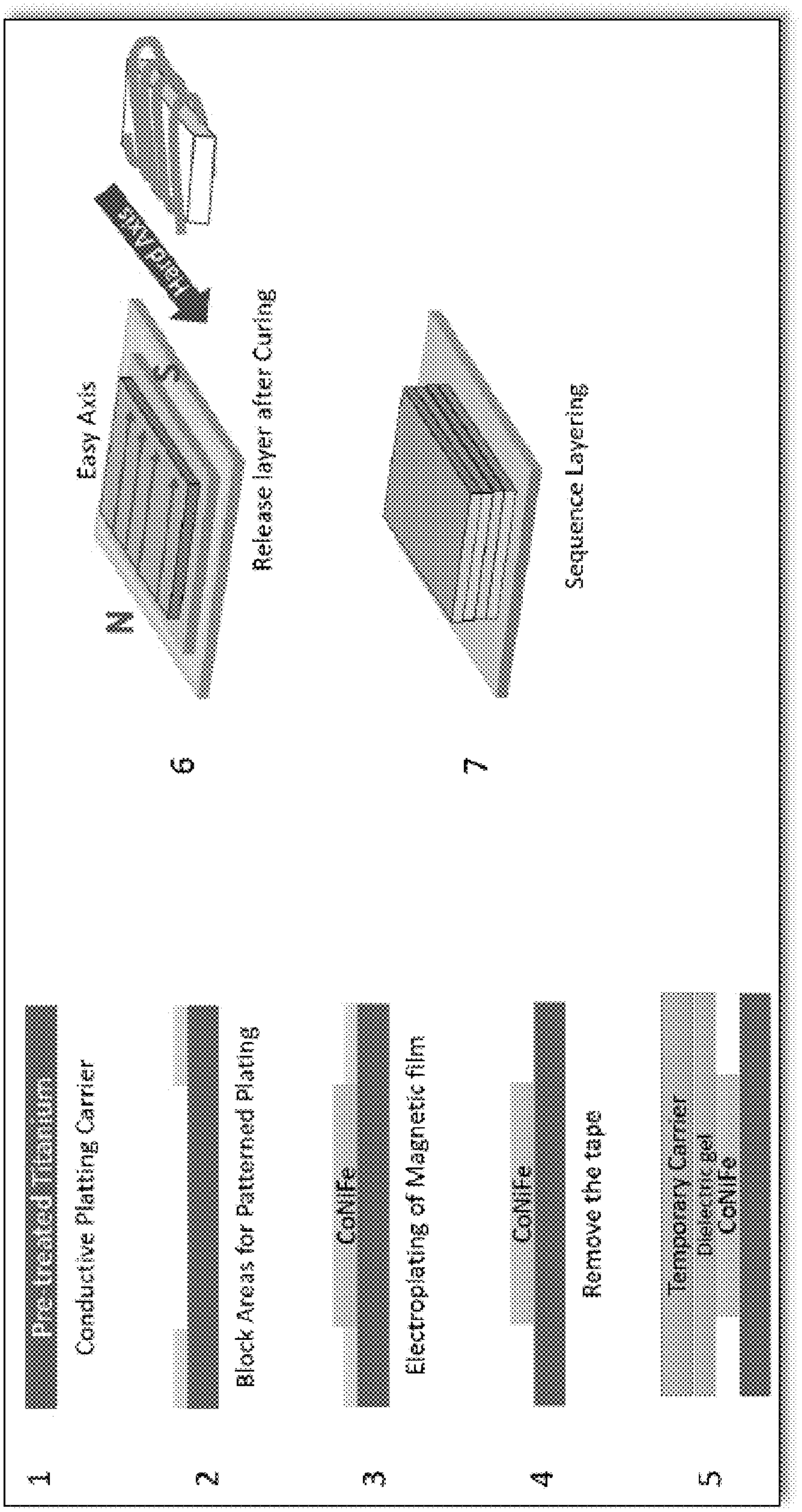
FIG. 8 shows a process flow of forming a multilayer magnetic core, according to an embodiment of the subject invention. Though certain materials are shown in FIG. 8, these are for exemplary purposes only and should not be construed as limiting.

Interlayered CoNiFe films and dielectric layers were fabricated to create a structure that can be placed around, above, and below the inductors. FIG. 8 shows a process flow for the fabrication process. At first, a conductive laminate of titanium (Ti) was used as the plating carrier. This laminate was pre-treated in a 3-minute bath of sulfuric acid (5%). In the second step, masking of the plating carrier was done with a non-conductive film so that the electroplating was prevented in certain regions and only achieved in required regions. Uncovered regions allow patterning of the metal in any desired design that could be later delaminated. Such patterning might also be achieved with screen-printing or micro assembly, but both of these constrain either the properties or process cost.

Figure 9:
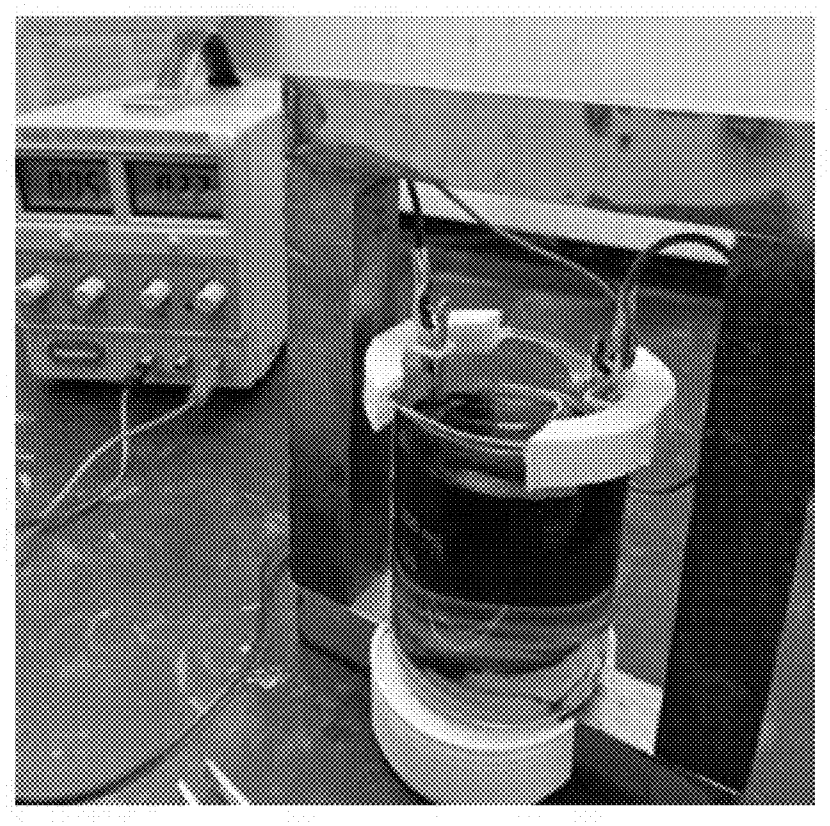
FIG. 9 shows an image of an electroplating setup with a magnetic field.

Before going to the next step, the sample was placed in the electroplating bath and connected to the DC supply as shown in FIG. 9. Some of the implementations done to this setup was to include three-dimensional (3D)-printed holders to secure the samples with more reliability. Then, the anode (+ probe) was assigned to be CoNiFe (e.g., KOVAR®, a commercial source of CoNiFe). The pre-treated Ti laminate covered with non-conductive film was placed in the cathode (− probe).

In the third step, the predetermined desired layer was electroplated on the uncovered region. Then, the covered regions with non-conductive film were removed in the fourth step. In the fifth step, the use of a temporary carrier and adhesive was implemented to delaminate the plated films from the Ti. Ideally the temporary carrier should be as thin as possible. The plated films have a poor adhesion to the Ti, and so it is easier to delaminate and transfer onto a temporary carrier. After the sixth step of delamination, the process goes in for the sequence layering. The key in this last step is to engineer the adhesion strength between different layers. This is achieved by using an encapsulating gel (e.g., DOWSIL® encapsulating gel), which can be diluted (e.g., diluted in a ratio of 3 to 1 with Xylene).

The adhesive serves two functions, first providing strong adhesion to the electroplated CoNiFe film so that it can be easily delaminate out of the Ti and second acting as an interlayer dielectric that isolates the plated magnetic films in the final multilayered core. The adhesive is durable, fast-curing, requires no primer, and has good mechanical strength. The curing time was just 2-3 min at 100° C. In order to spread the adhesive properly, a spin coating technique was used. The thickness control of the adhesive was also optimized in the spin coating. A uniform spread of almost 1 μm thickness of adhesive was obtained between the two layers of film. After curing, the adhesion strength was adequate for subsequent film-transfer steps. This is how layer after layer was built using adhesive, and any number of layers can be built that is desired.

The permeability measurements were performed with a BH looper, with the sample oriented in the parallel and transverse directions. Various inductor test structures were fabricated and tested, with the results shown in the tables in FIGS. 31 and 32.

Example 3

Ansys is an engineering simulation and 3D design software that was used to model various inductor topologies and magnetic properties of the composites. A 3D model for each type of inductor topology was designed keeping the area constraints within 15 $mm^2$ (i.e., the total footprint was 15 $mm^2$ or less). Two topologies were analyzed—spiral and solenoids.

Figure 10:
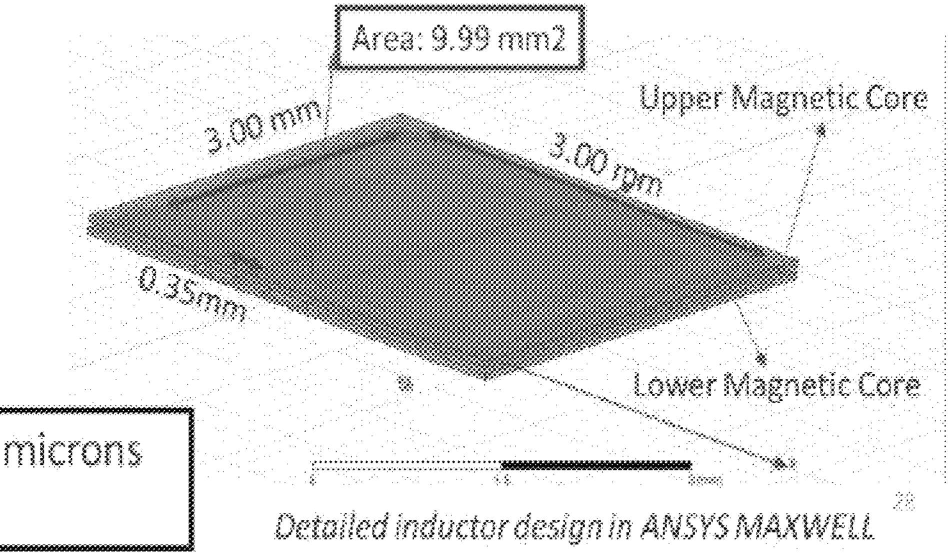
FIG. 10 shows a spiral inductor with magnetic material on top and below, according to an embodiment of the subject invention. Though certain dimensions are shown in FIG. 10, these are for exemplary purposes only and should not be construed as limiting (though they were used in the example that references this figure).

First, a 1-turn spiral inductor with magnetic material above and below was considered. Because of the required low DC resistance, a spiral inductor with only one copper winding turn was designed, as shown in FIG. 10. Planar inductors such as spiral inductors only require one metal layer and the magnetic cores do not need to be patterned. These attributes simplify the fabrication process and make it an ideal choice of interest to reduce footprint. However, the results for this structure did not meet a 10× (10 times) enhancement in inductance when compared to its baseline of an air-core inductor.

Figure 11:
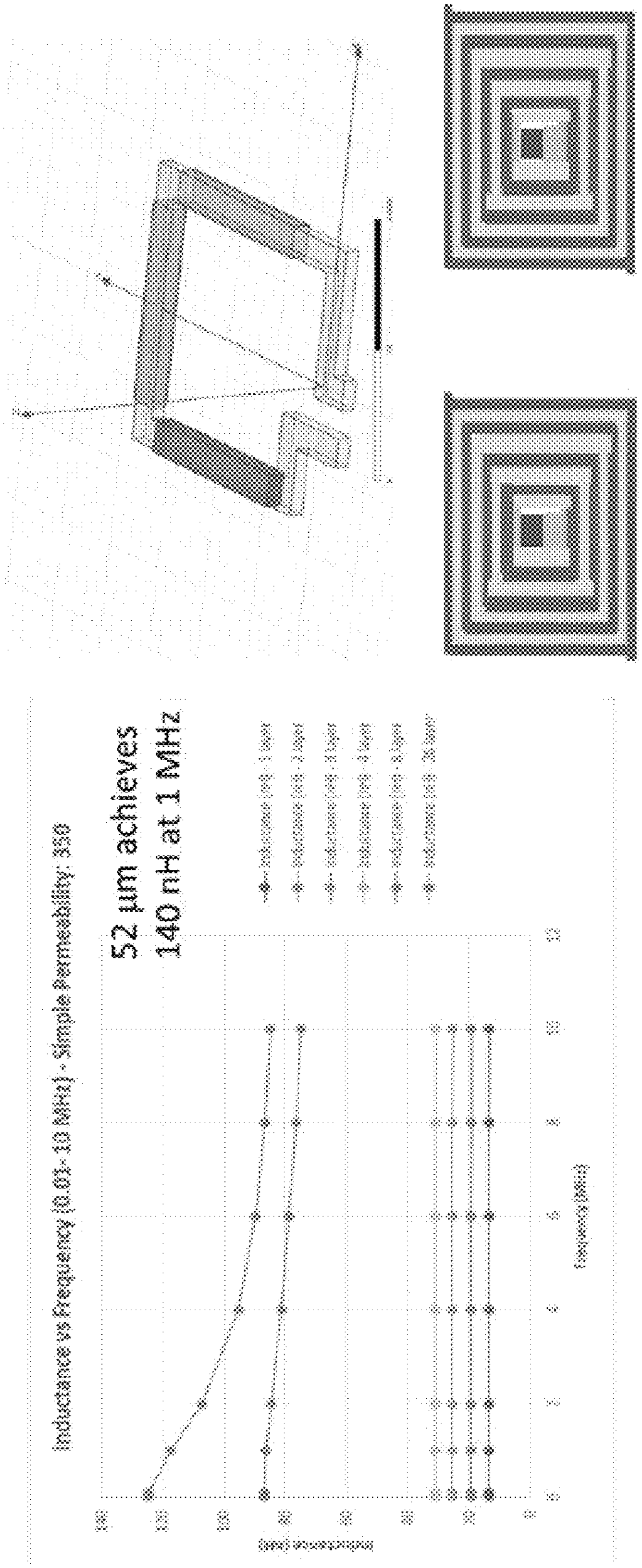
FIG. 11 shows a plot of inductance (in nanohenries (nH)) versus frequency (in megahertz (MHz)) for different inductors, with the layout shown at the right of the figure. In the plot, the curves are for (from highest inductance values to lowest inductance values) 26-layer, 8-layer, 4-layer, 3-layer, 2-layer, and 1-layer.

The second structure considered included the same spiral inductor but this time by assuming a perfect wrapping of the copper trace with a magnetic composite. Initial models and simulation results, shown in FIG. 11, indicate that the magnetic-core inductors with permeability of about 140 can provide up to about 11× enhancement in inductance as compared to air-core inductors with a baseline of about 10 nanohenries (nH). One of the main challenges of this structure remains its manufacturability. The implementation of a perfect closed-loop system is obscured by small gaps that create a leakage of the magnetic flux, and inductance is highly disturbed.

For this design, copper traces were built using the design tool in Ansys to create volumetric designs. A magnetic material was wrapped around the copper traces with the appropriate thickness and airgap to simulate a closed loop magnetic flux.

Figure 12:
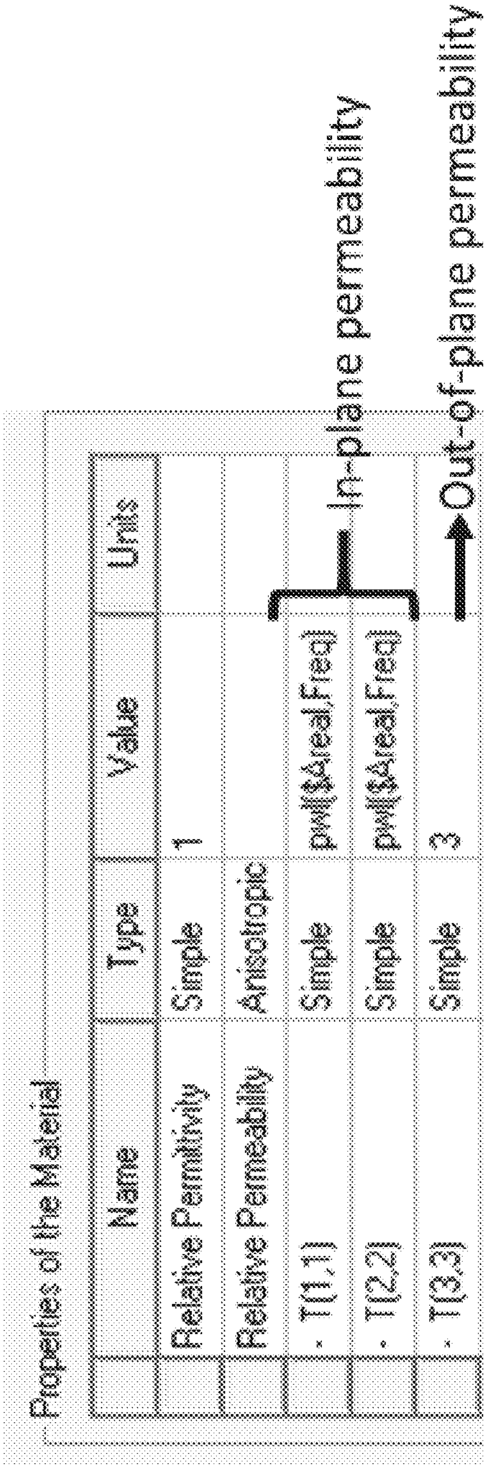
FIG. 12 shows a table with values for incorporation of magnetic materials with anisotropic permeability into Ansys HFSS.

The next step was the application of material models and boundary conditions. The excitations are required to be defined and this determined the input current at which the simulation will run. A key step is to define the input currents by selecting the faces of the object into which the current will flow. ANSYS allows input of three different types of relative permeability depending on the application. There are three options available: simple permeability; anisotropic; and nonlinear. Nonlinear panel allows uploading of the BH loop of the material into the system and running of the simulation with it. However, the nonlinear option assumes that the BH loop is the same for each direction of the structure. An anisotropic permeability was worked with by uploading the BH curve in the direction in which the magnetic material was placed. For example, each copper trace from the spiral design is being covered in-plane and out-of-plane direction with magnetic material. Thus, T(1,1), T(2,2), T(3,3) in FIG. 12 were assigned with the corresponding BH loop obtained from the BH looper experiment.

Figure 13:
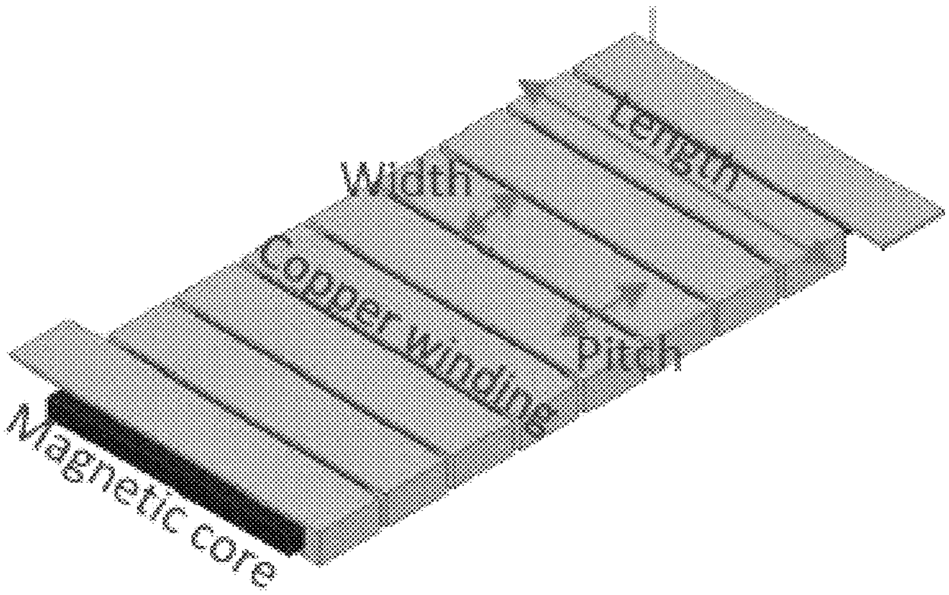
FIG. 13 shows a schematic view of a three-dimensional (3D) view of a substrate-embedded solenoid inductor.

Solenoid designs were considered in this paper because of their high current-handling capacity (see also, e.g., Mathuna et al., Power Supply on Chip for High Frequency Integrated Voltage Regulation, in IEEE APEC Charlotte, North Carolina, 2015; which is hereby incorporated herein by reference in its entirety). Various solenoid designs were modeled and designed to achieve high-current handling and high inductance density. The aforementioned high-permeability metal-polymer composites were used as the cores for all inductor designs. The 3D view of a designed solenoid inductor is shown in FIG. 13. The electrical performance of the designed solenoid inductors was optimized by changing the winding width, length, and via pitch (distance from one winding to the same spot on the next). The total component thickness was limited to 600 μm or less to enable the integration of power inductors into substrates to implement integrated voltage regulators (IVRs).

Figure 14A:
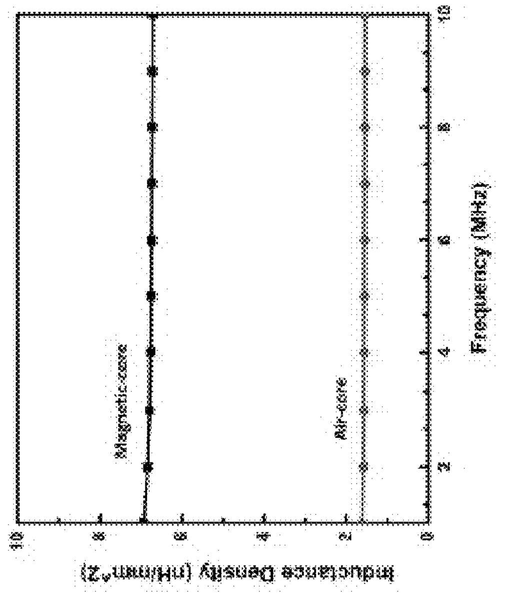
FIG. 14(*a*) shows a plot of inductance density (in nH per square millimeter ($nH/mm^2$)) versus frequency (in MHz), showing simulated inductance of air-core and magnetic-core inductors.
Figure 14B:
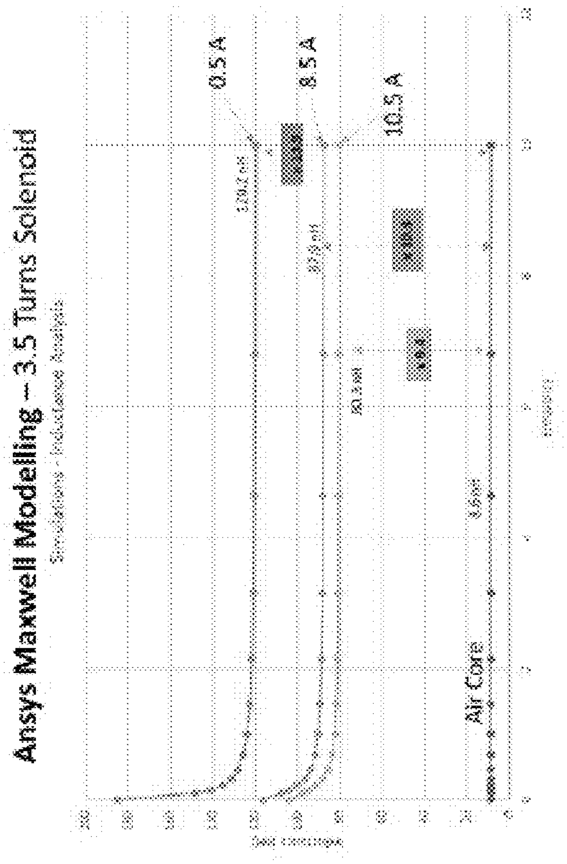

FIGS. 14(*a*) and 14(*b*) show the simulated inductance density as a function of frequency. The optimized inductors show a stable inductance density of about 7.2 nH/mm$^2$ at a frequency in a range of 1 MHz to 10 MHz, with a DC resistance of 14 mΩ. As compared to an air-core inductor with the same structure and dimensions, the designed solenoid inductor showed about 4× improvement in inductance density, as indicated by FIGS. 14(*a*) and 14(*b*).

Example 4

Figure 15:
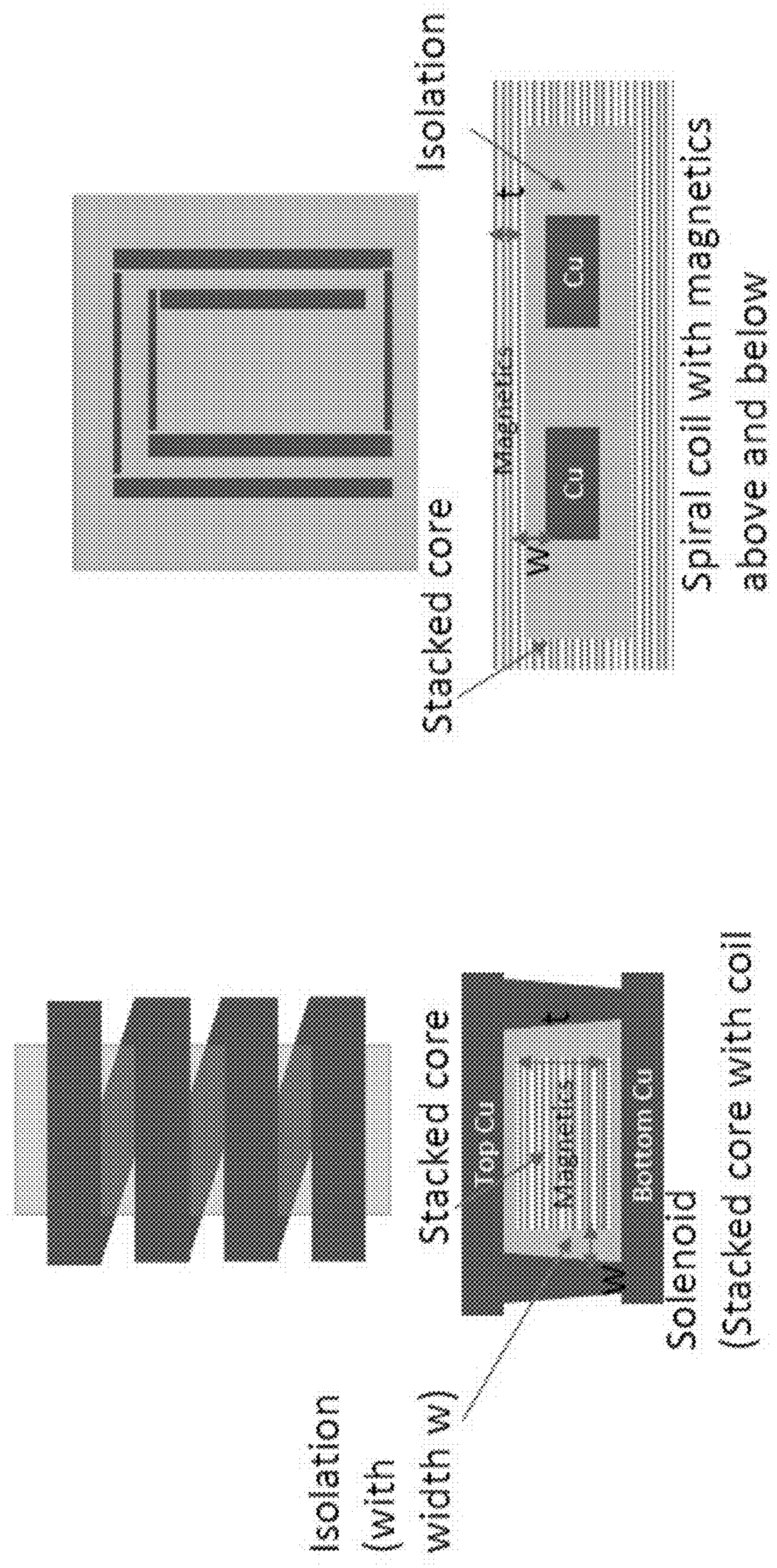
FIG. 15 shows a schematic view of a copper-magnetics-copper (CMC) inductor (top-left), an MCM inductor (top-right), a solenoid inductor (bottom-left, which is also CMC), and a spiral inductor (bottom-right, which is also MCM).

High inductance-density inductors with magnetic cores tend to be saturated at low current. Therefore, current handling capacity become another critical parameter to judge the performance of power inductors. Saturation of the magnetic cores can be avoided by innovative inductor topologies. Different topologies have their own pros and cons. For example, solenoid inductors have low $L/R_{DC}$ but high-current handling, whereas spiral inductors have high $L/R_{DC}$ but low-current handling. Because the topologies of inductors play an important role in determining the performance of inductors, inductor topologies can be considered as follows. Based on how the magnetic cores and copper windings are integrated, the topology can be: a) CMC (copper-magnetic-copper) inductors include magnetic cores enclosed within the copper windings (e.g., solenoid inductors); or b) MCM (magnetic-copper-magnetic) inductors include two magnetic layers sandwiching copper windings therebetween (e.g., spiral inductors). These are also shown in FIG. 15, with CMC on the left and MCM on the right.

Figure 16:
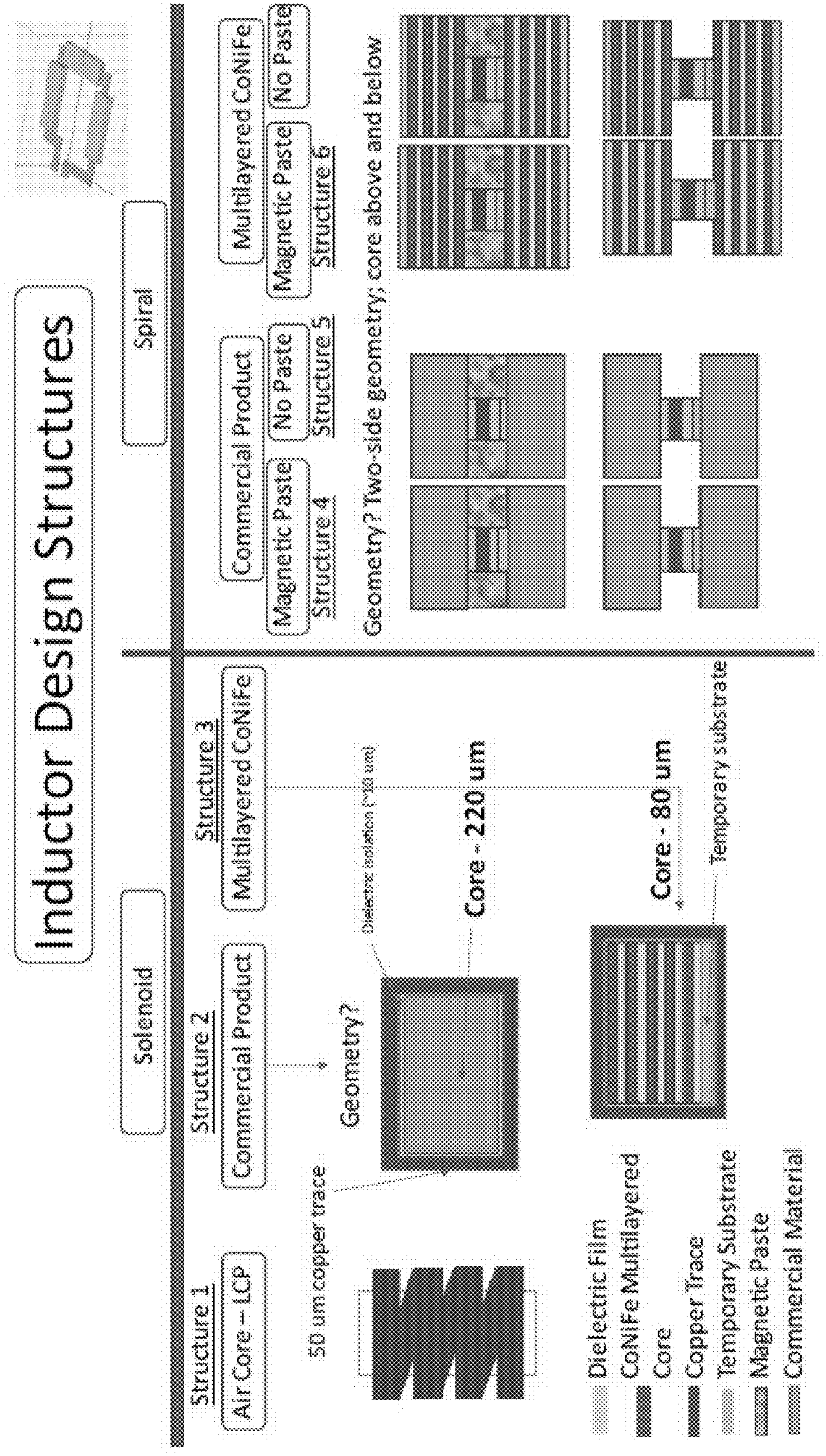
FIG. 16 shows a diagram with solenoid structures (left) and spiral structures (right). Though certain dimensions are shown in FIG. 16, these are for exemplary purposes only and should not be construed as limiting (though they were used in the example that references this figure).

Solenoids designs can be sub-categorized into: solenoids with open flux path; and solenoids with closed flux path. This is depicted in FIG. 16, left section of the chart. Solenoids with closed flux path have windings on a core, and the periphery is enclosed with extra layers of material for creating a closed magnetic circuit.

The energy stored in power inductors as the magnetic field is given by the following equation.

$$E = \frac{1}{2}LI^2 \tag{1}$$

where L is the inductance of the inductor and I is the current through the inductor Equation (1) plainly shows that inductors with high inductance can store more energy. Hence, a goal is to increase the inductance of the inductor for high energy electromagnetics devices. The self-inductance of an inductor depends upon the characteristics of its construction. Optimizing these factors is crucial for the success of increasing the inductance. At first, these factors can be deduced from the fundamental equations of electromagnetism. Self-inductance of a coil is defined as the magnetic flux linkage (Nφ) divided by the current.

$$L = N\frac{\varphi}{I} \tag{2}$$

where φ=magnetic flux and N=number of turns. Further, magnetic flux produced in a coil is given by:

$$\varphi = BA \tag{3}$$

where B=flux density and A=area. Also, the magnetic flux density within the core of a long solenoid is given by:

$$B = n\ \mu\ I \tag{4}$$

where, n=number of turns per unit length and μ=permeability of the core material. Using the above formula, an approximation of inductance for any coil can be calculated.

or, or, $$L = N\frac{\varphi}{I} \quad \text{[From equation (2)]}$$

$$L = N\frac{BA}{I} \quad \text{[From equation (3)]}$$

$$L = N\frac{n\mu IA}{I} = Nn\ \mu A \quad \text{[From equation (4)]}$$

$$L = \frac{\mu\ N^2 A}{l} \quad \left[\text{Since } n = \frac{N}{l}\right]$$

$$L = \frac{\mu\ N^2 A}{l} \quad (5)$$

or, or,

Factors like size and length are already optimized in the electromagnetics devices and so there is very little room available here for further improvement of the inductance. Therefore, the possibility of attaining very high coefficients of self-induction reduces to just two factors: permeability of the core; and number of turns. Inductors that are designed to have a large number of copper turns result in high DC resistance and DC loss, which leads to low efficiency. Therefore, inductance per DC resistance ($L/R_{DC}$) becomes an important factor in describing the efficiency of inductors. In order to increase the $L/R_{DC}$ value, high-permeability magnetic materials can be used as the cores of inductors (enhancing the inductance).

Without suitable designs, inductors cannot utilize the benefits brought by the magnetic materials with superior properties. Each inductor topology has its own advantages and disadvantages. Therefore, suitable inductor designs are needed to achieve high inductance, high current handling, and low DC resistance.

Figure 17C:
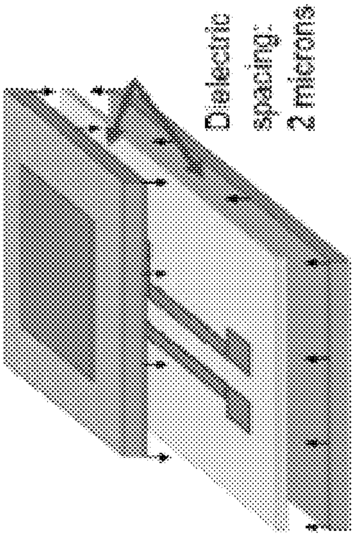
FIGS. 17(*a*)-17(*c*) show 3D views of a one-turn magnetic core power inductor. Though certain dimensions are shown in FIGS. 17(*a*)-17(*c*), these are for exemplary purposes only and should not be construed as limiting (though they were used in the example that references this figure).
Figure 17B:
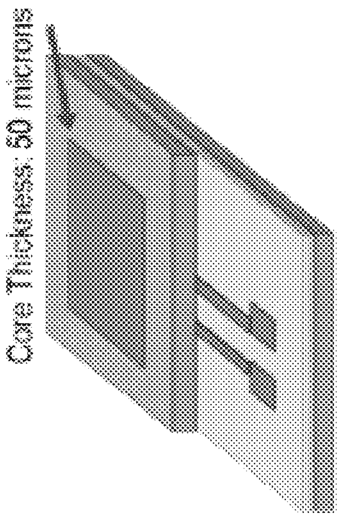
Figure 17A:
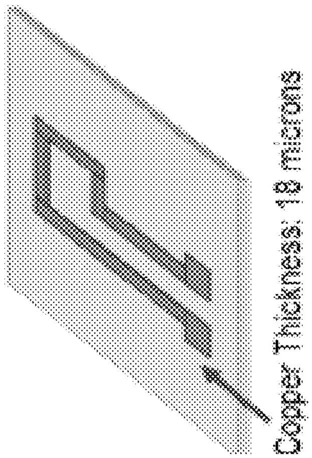

FIGS. 17(*a*)-17(*c*) shows a 3D view of a designed one-turn magnetic-core power inductor with a spiral design. Referring to FIGS. 17(*a*)-17(*c*), photolithography was performed on a copper clad with 18 μm of copper on both sides and a 200 μm substrate. Then, a piece of liquid crystal polymer (LCP) substrate was patterned with a cavity in order to hold the magnetic composite placing it above and below the copper winding.

Figure 18:
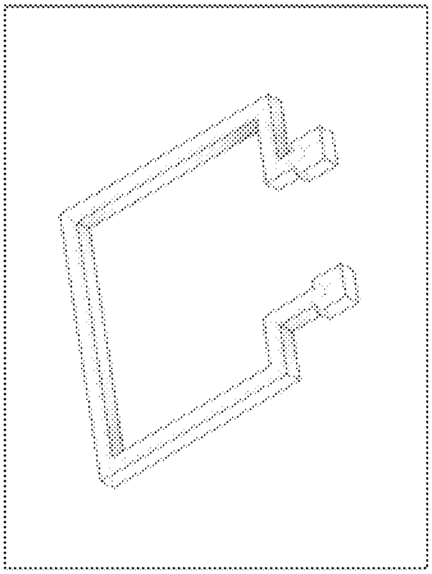
FIG. 18 shows an image of a one-turn spiral inductor.

Another design was a four-side structure as seen in FIG. 18, where the magnetic loop was attempted to be closed. This was necessary due to magnetic leakage on the sides of the structure in FIGS. 17(*a*)-17(*c*). The process starts by using a milling machine to remove one of the copper layers of the copper clad. Then, this copper clad is patterned using an ultraviolet (UV) laser with a resolution of 30 μm. The sample is shown in FIG. 18.

The next step is to implement the magnetic composite. Small pieces of magnetic core were cut and placed manually around the one-turn copper trace. However, one of the main challenges remained that in simulations the inductance density requirement was achieved assuming this is a perfect closed-loop magnetic flux structure. Also, it is not as cost effective to place the side cores if it actually was manufactured on a large scale. During testing, the inductance density was not met mainly due to small separations between the core pieces, which created magnetic flux leakage.

In order to build solenoids, an 18 μm copper tape was used that could be patterned using a laser. Thin strips (0.25 mm) were cut and wrapped around the two types of magnetic composites. One of the main challenges is to meet the DC resistance, which can be optimized with via filling or photolithography for the copper windings. In addition to this, a new magnetic structure was required to surpass the inductance density and meet current handling requirements. This was performed in hand with the implementation of a magnetic paste.

Figure 19B:
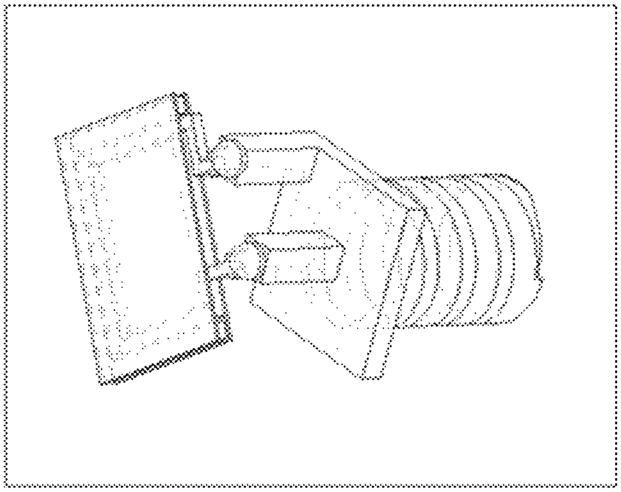
FIG. 19(*a*) shows an image of a solenoid wrapped around a commercial magnetic material core with a closed loop using magnetic paste.
Figure 19A:
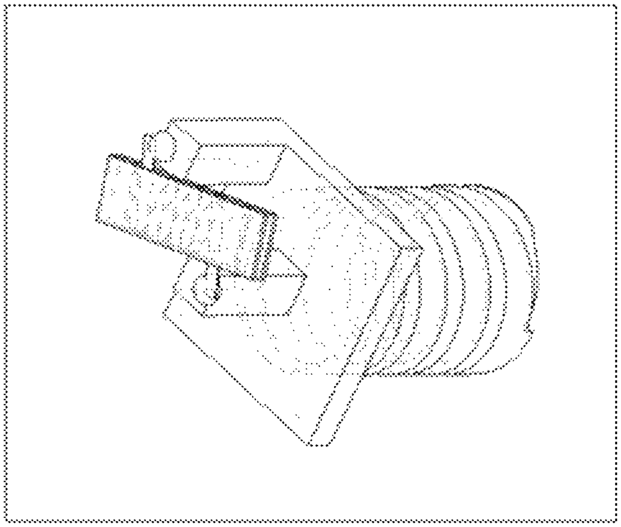

FIG. 19(*a*) shows an image of a solenoid structure wrapped around a core with a closed loop (with a magnetic paste). FIG. 19(*b*) shows a spiral structure with a magnetic core with a magnetic paste. The paste was synthesized by using Novamet's permalloy flakes. This was chosen due to its lower coercivity of 10 Oe compared to nickel and stainless steel flakes that show values in the range of 62 Oe to 123 Oe. The magnetic saturation was equal to $42\times10^{-3}$ electromagnetic units (emu), and its remanent magnetization was $7\times10^{-3}$ cmu. This was combined with EC-9519 encapsulant by Engineered Materials Systems; EC-9519 is a UV curable surface mount device encapsulant with a viscosity of 4000 centipoise (cps) with a cure of 450 Joules per square centimeter (J/cm$^2$) and a resistance of more than 1000 megaOhms (MΩ). 3.2 grams (g) of magnetic powder and 0.72 g of epoxy were mixed to achieve a 40% magnetic powder solution (volume/volume (v/v)). The magnetic powder density was 8 grams per cubic centimeter (g/cc), and the epoxy density was 1.2 g/cc.

The purpose of this mixture was to act as a magnetic filler to eliminate airgaps and close the magnetic loop, seal magnetic layers, and reduce power losses at high frequencies. The cross-sectional area of the flakes can reduce eddy current losses. Results on inductance performance over frequency showed enhancement in inductance. In FIG. 19(*a*), the paste was placed on the edges of the upper and lower core, while in the spiral (FIG. 19(*b*)), the paste was spread all over between the copper trace and bottom magnetic layer to allow adhesion between the two magnetic layers.

Inductance as a function of frequency was characterized for the inductors using a vector network analyzer (VNA). The set-up included three parts: sample; connection; and signal generator. The signal generator, which is the VNA, generates AC signals with frequencies ranging from 0.1 MHz to 10 MHz. The two inductor pads are connected to the ground and signal ports of the SubMiniature version A (SMA) connectors using long connection wires. Later, the long thin wires and solder device under test (DUT) was moved directly on the SMA connector. The AC signal travels from the signal port to the inductor and returns from ground port to the VNA.

Figure 21:
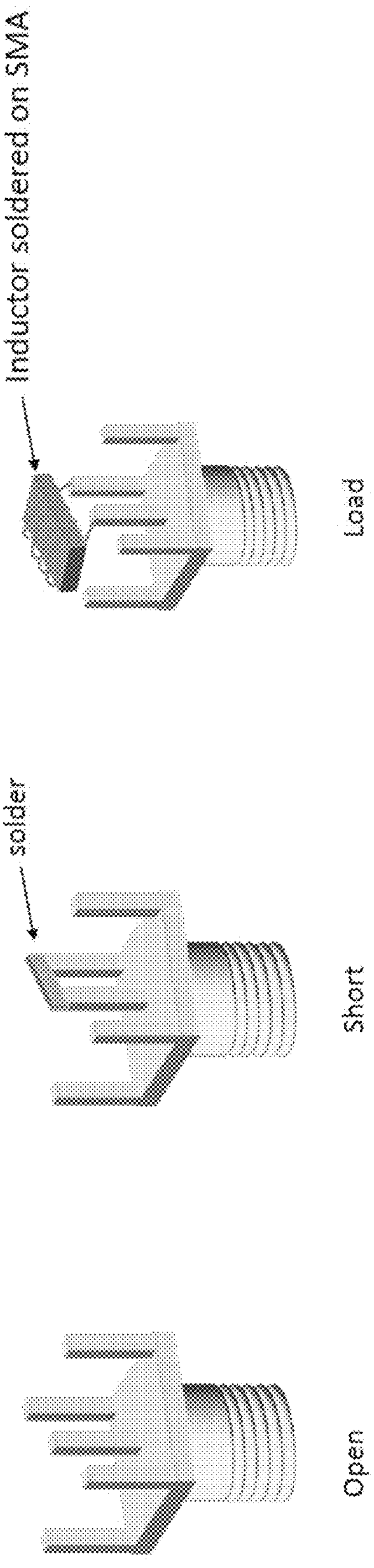
FIG. 21 shows an image of de-embedding structures with open, short, and load configurations.

In order to measure the accurate inductance of the DUT, the inductance of the two connection wires also need to be measured by the VNA with de-embedding structures. These de-embedding structures are necessary for accurate measurements. De-embedding structures have three parts, known as open, short, and load. The function of the three de-embedding structures is to remove the effect of the parasitic from the two connecting wires and allow the VNA to solely measure the inductance from inductor. FIG. 21 shows the de-embedding structures with open, short, and load. This is applied when samples are attached to the wires. However, when directly connected to the SMAs, the calibration process is performed with probes.

Figure 22:
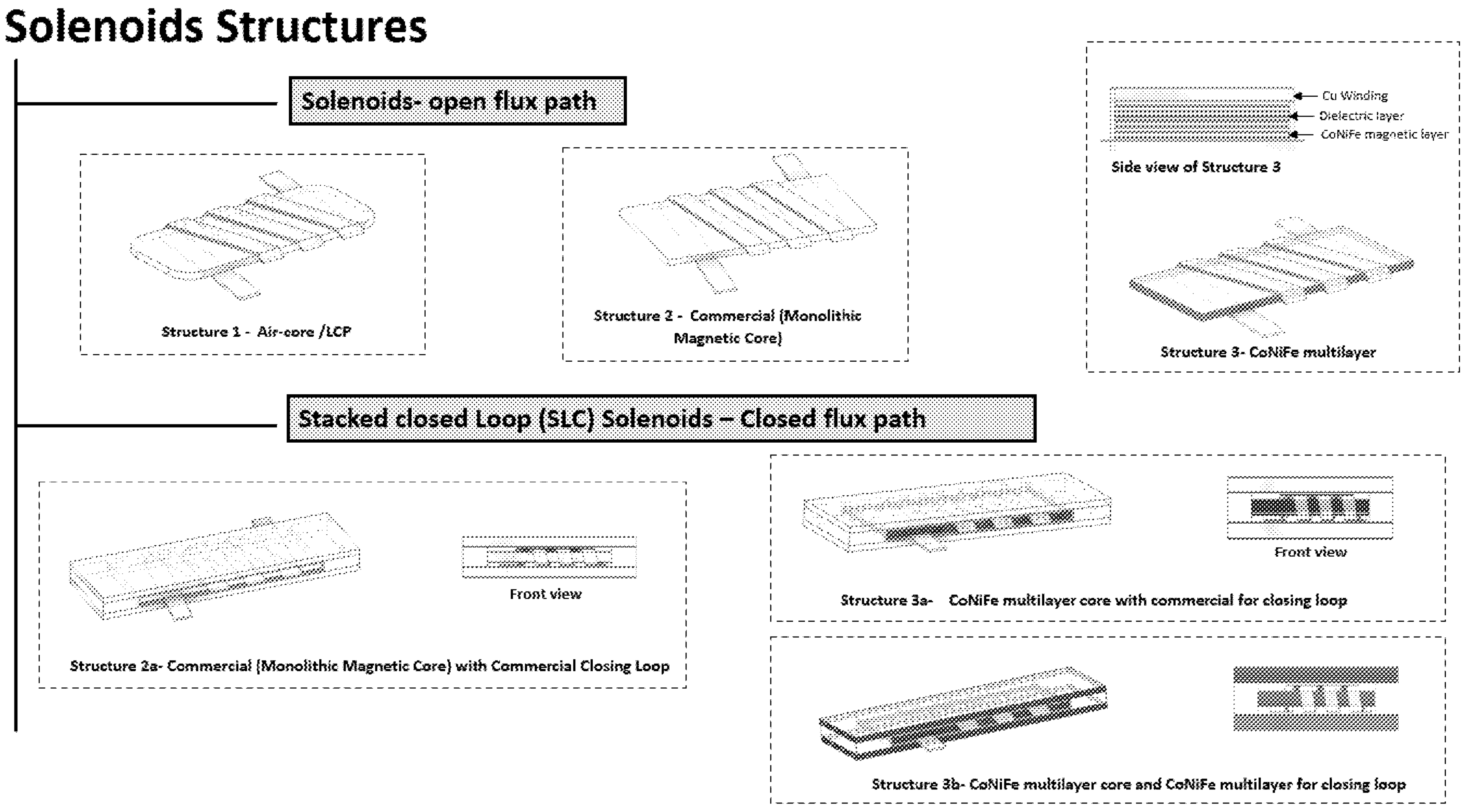
FIG. 22 shows a diagram characterizing solenoid structures and their corresponding modified version (closed loop). Though certain dimensions are shown in FIG. 22, these are for exemplary purposes only and should not be construed as limiting (though they were used in the example that references this figure).

With the de-embedding structures, the inductance for inductors can be calculated after subtracting the inductance from connection wires. Without using the de-embedding structures, the measured inductance is sum of the inductance from connection wires and the inductance from inductors ($L_{inductor}=L_{load}-L_{short}$). Using this formula, $L_{inductor}$ is calculated for all the different structures (structure 1, structure 2, structure 3, and so on . . . ). For the comparison between different structures, the 'X' factor is calculated that represent how many more times the inductance is higher than its baseline ($L_{inductor(Air\ core)}$), which is structure 1 for the solenoid topology.

$$L_{inductor\ (structure\ 1)} = L_{load1} - L_{Shor\ 1}$$

$$L_{inductor\ (structure\ 2)} = L_{load2} - L_{Short2}$$

$$L_{inductor\ (structure\ 3)} = L_{load\ 3} - L_{Short\ 3}$$

$$X_{21} = \frac{L_{inductor\ (structure\ 2)}}{L_{inductor\ (structure\ 1)}}$$

where $X_{21}$=number of times inductance of structure '2' is higher than its baseline (Air core, structure '1').

$$X_{31} = \frac{L_{inductor\ (structure\ 3)}}{L_{inductor\ (structure\ 1)}}$$

where $X_{31}$=number of times inductance of structure '3' is higher than its baseline (Air core, structure '1'). FIG. 22 provides an overview of the solenoid open-flux path structures and the information is summarized in the table in FIG. 33 (top portion is for solenoids with an open flux path and bottom portion is for solenoids with a closed flux path).

Four different design structures were used for spirals. The use of magnetic paste was implemented in two of the spiral structures to enhance the permeability of the core. Further information can be seen in FIG. 16 (right side). The table in FIG. 34 (for spirals) also shows information on the spiral structures.

Figure 23B:
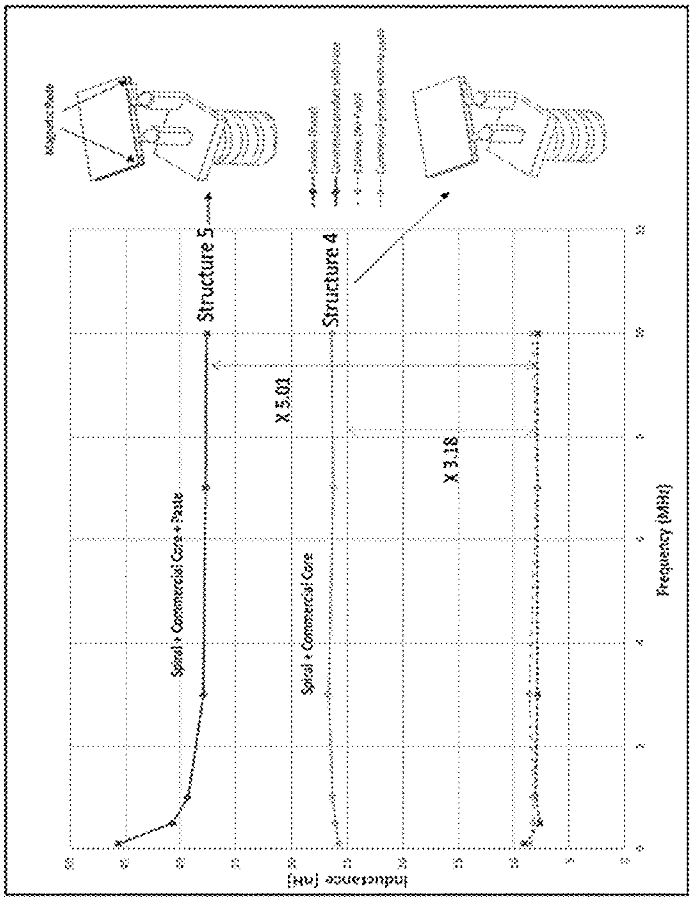
FIG. 23(*a*) shows a plot of inductance (in nH) versus frequency (in MHz) for structure 2 and structure 3 solenoids.
Figure 23A:
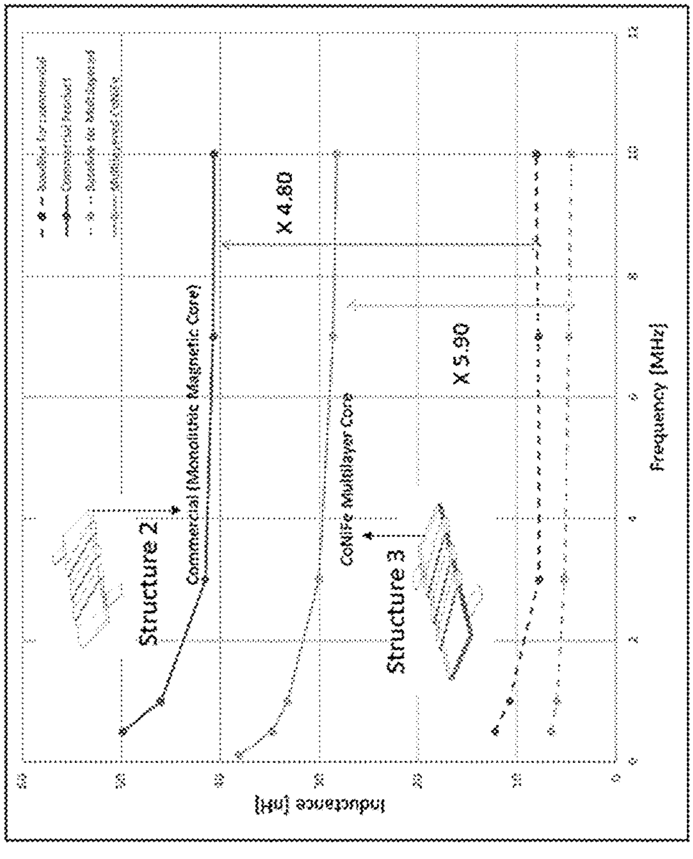

FIG. 23(*a*) shows a plot of inductance (in nH) versus frequency (in MHz) for solenoid structures 2 and 3; and FIG. 23(*b*) show a plot of inductance (in nH) versus frequency (in MHz) for spiral structures 4 and 5. These graphs show how the inductance performs over the frequency range from 0.1 MHz-10 MHz for these structures.

Figure 20A:
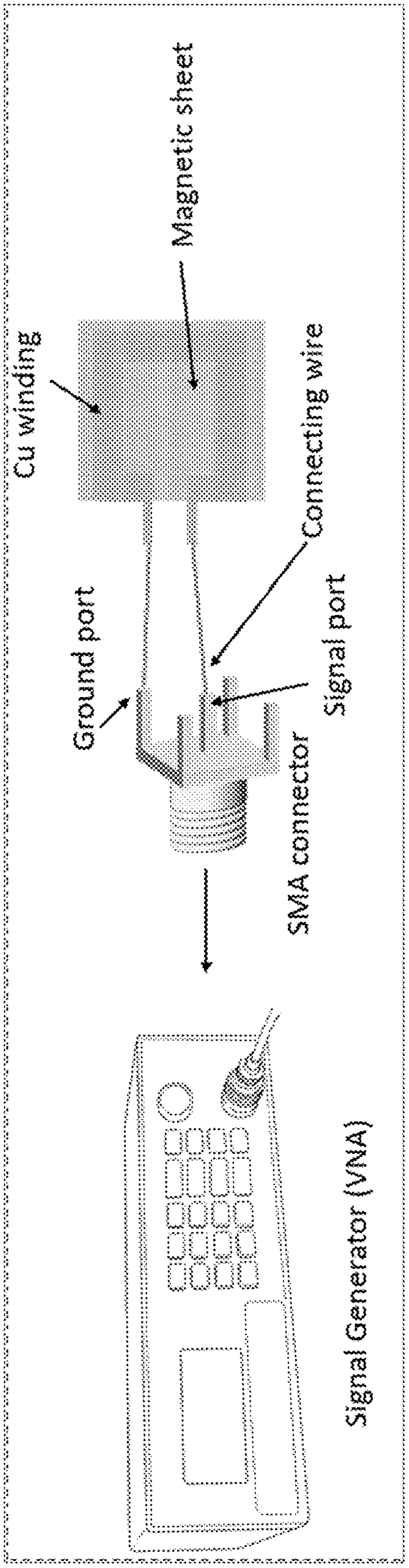
FIG. 20(*a*) shows an image of a set-up for inductance measurement at various frequencies.
Figure 20B:
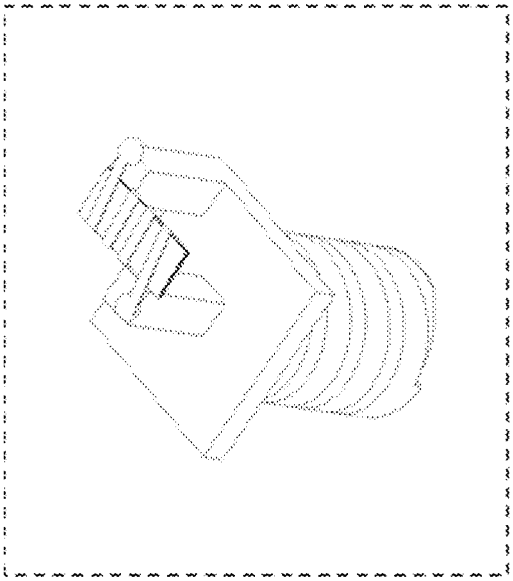
Figure 24:
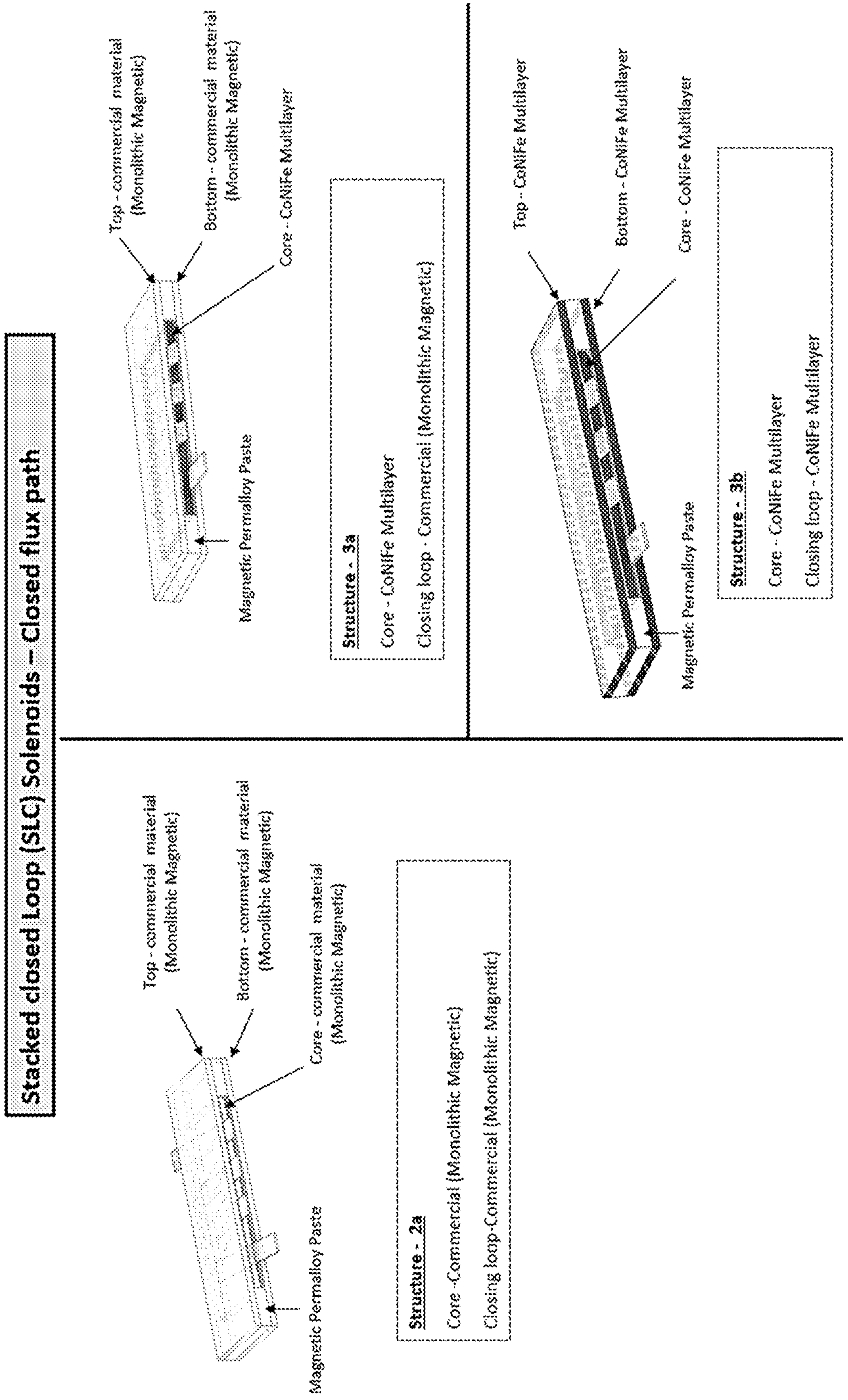
FIG. 24 shows modified solenoid inductor structures 2*a* and 3*a* (closed loop with magnetic paste).
Figure 25A:
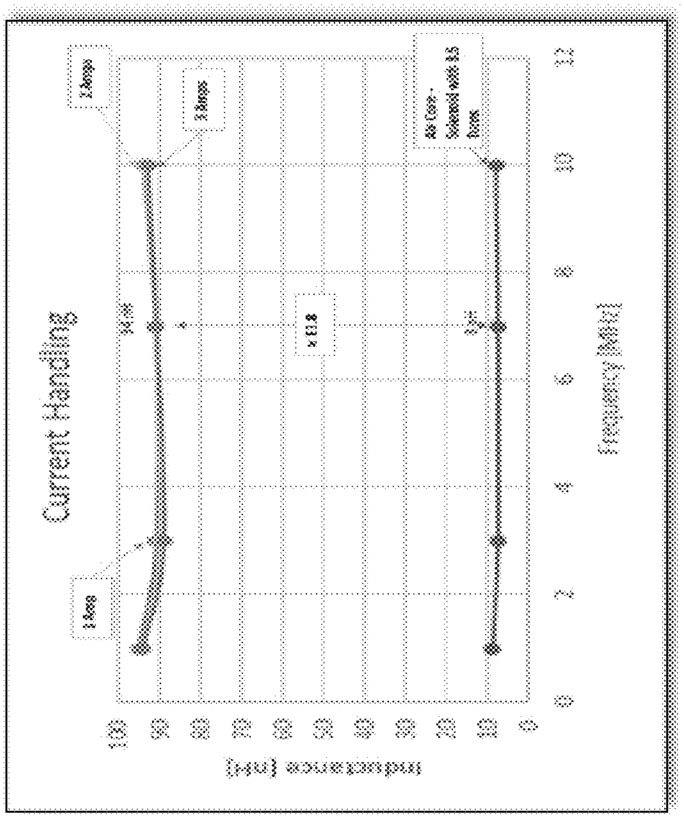
FIG. 25(*a*) shows a plot of inductance (in nH) versus frequency (in MHz) for structure 2*a* solenoids and an air-core solenoid.
Figure 25B:
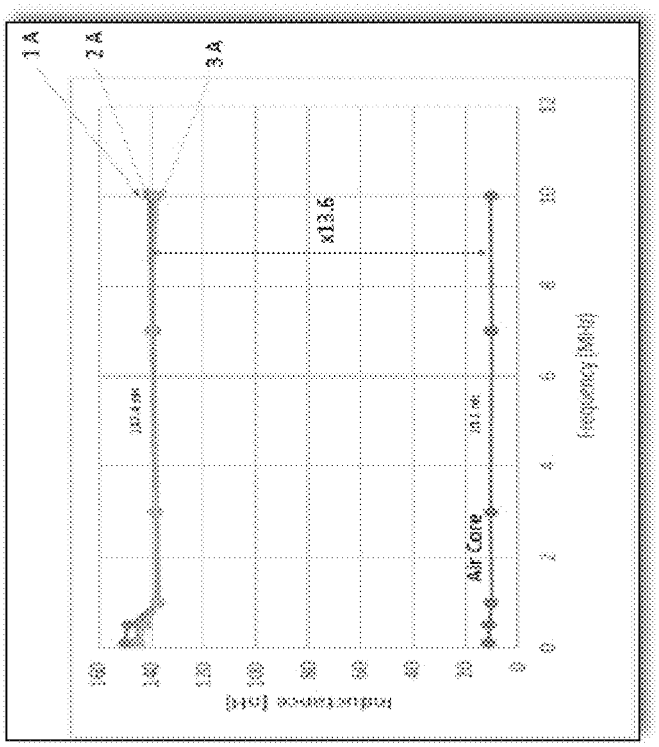
Figure 26:
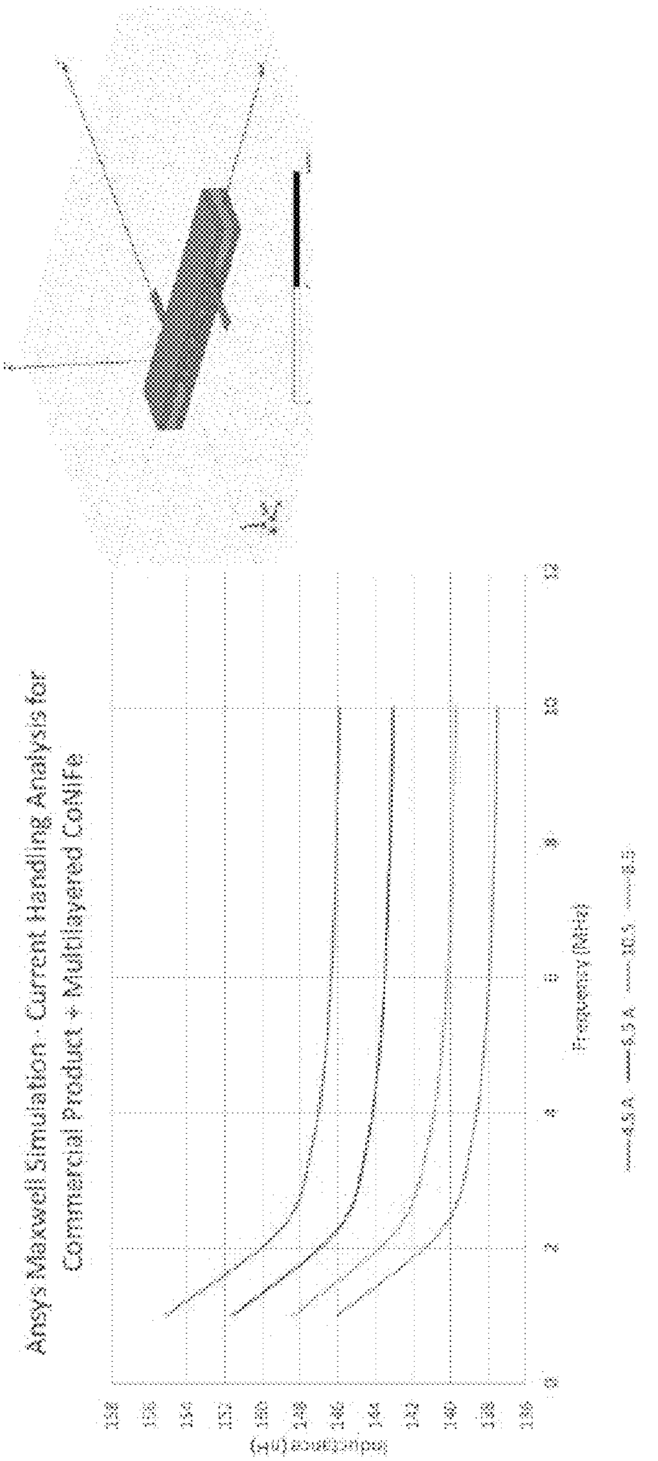
FIG. 26 shows a plot of inductance (in nH) versus frequency (in MHz), showing Ansys simulation inductance values using structure 3*a* solenoids at different currents. The curves are for (from highest inductance values to lowest inductance values) 4.5 A, 6.5 A, 8.5 A, and 10.5 A.

FIG. 24 shows modified solenoid structures 2*a* (modified version of structure 2) and 3*a* (modified version of structure 3). The modified solenoids structures with closed magnetic circuit showed high inductance (more than ×10) as compared to their corresponding solenoids with open flux path. In terms of current handling, up to 3 A there is a negligible decrease in inductance for both structures, as shown in the plots in FIGS. 25(*a*) (for 2*a*) and 25(*b*) (for 3*a*). One of the desired requirements is to meet the 10 A within an area of 10-15 $mm^2$ or lower (1 A/$mm^2$). Simulations using Ansys Maxwell confirm this requirement is met, as shown in FIG. 26 for structure 3*a*. The current and inductance density requirements are met. One possibility to consider is to decrease the size of the sample in order to use the same setup from FIGS. 20(*a*) and 20(*b*). This is due to the capabilities using a bias tee that can be used up to 3 A. Thus, by decreasing the sample to 3 $mm^2$ and inputting 10 A, it can be confirmed that the magnetic structure can sustain 3 A with an area of no more than 3 $mm^2$, or 1 A/$mm^2$.

Example 5

Toroid inductors have the lowest reluctance because of the closed magnetic loop. With a few turns, enough inductance can be created with this low reluctance. However, the flux can easily saturate the magnetic core. In order to inhibit or prevent the saturation, airgaps can be introduced. In equations TR1-TR5 below, $i_{sat}$ is saturation current; N is number of turns; R is the reluctance, $R_g$ is the reluctance from airgap, $R_m$ is the reluctance from the magnetic core, and a is defined as effective reluctance enhancement factor with air-gap. Even though the reluctance is defined as Amp/(Henry×Amp) or (1/Henry), it is represented here as (α×length parameter/permeability of air). For simplicity, effective reluctance or simply reluctance is considered as just the length parameter in microns (μm) as the dimensionless permeability is considered. The reluctance can be tuned from 5 μm to hundreds of μm to achieve the target current-handling and inductance density. The saturation current is calculated as $$i_{sat} = \frac{\Phi\mathcal{R}}{N} = \frac{B_{sat}A_g(\mathcal{R}_m + \mathcal{R}_g)}{N} = \frac{B_{sat}\ \alpha(L_g)}{\mu_g\ N} \quad \text{(Equation: TR1)}$$

$$\text{Reluctance} = \mathcal{R}_m + \mathcal{R}_g = \frac{(L_c)}{\mu_c} + \frac{(L_g)}{\mu_g} = \frac{\alpha(L_g)}{\mu_g} \quad \text{(Equation: TR2)}$$

$$i_{sat} = \frac{1.5e12\frac{HA}{\text{micron}^2}\ \text{width}\ x\ t\ \alpha\ (l\ \text{microns})}{N\ 1.256\ e12\ \frac{H}{\text{micron}}\ \text{width}\ x\ t} \quad \text{(Equation: TR3)}$$

$$i_{sat} = \frac{1.5e12\ \alpha\ (l\ \text{microns})}{N\ 1.256\ e12\ \frac{H}{\text{micron}}} \quad \text{(Equation: TR4)}$$

$$i_{sat} = \frac{1.2\ \alpha\ l\ (\text{microns})}{N} \quad \text{(Equation: TR5)}$$

Figure 27:
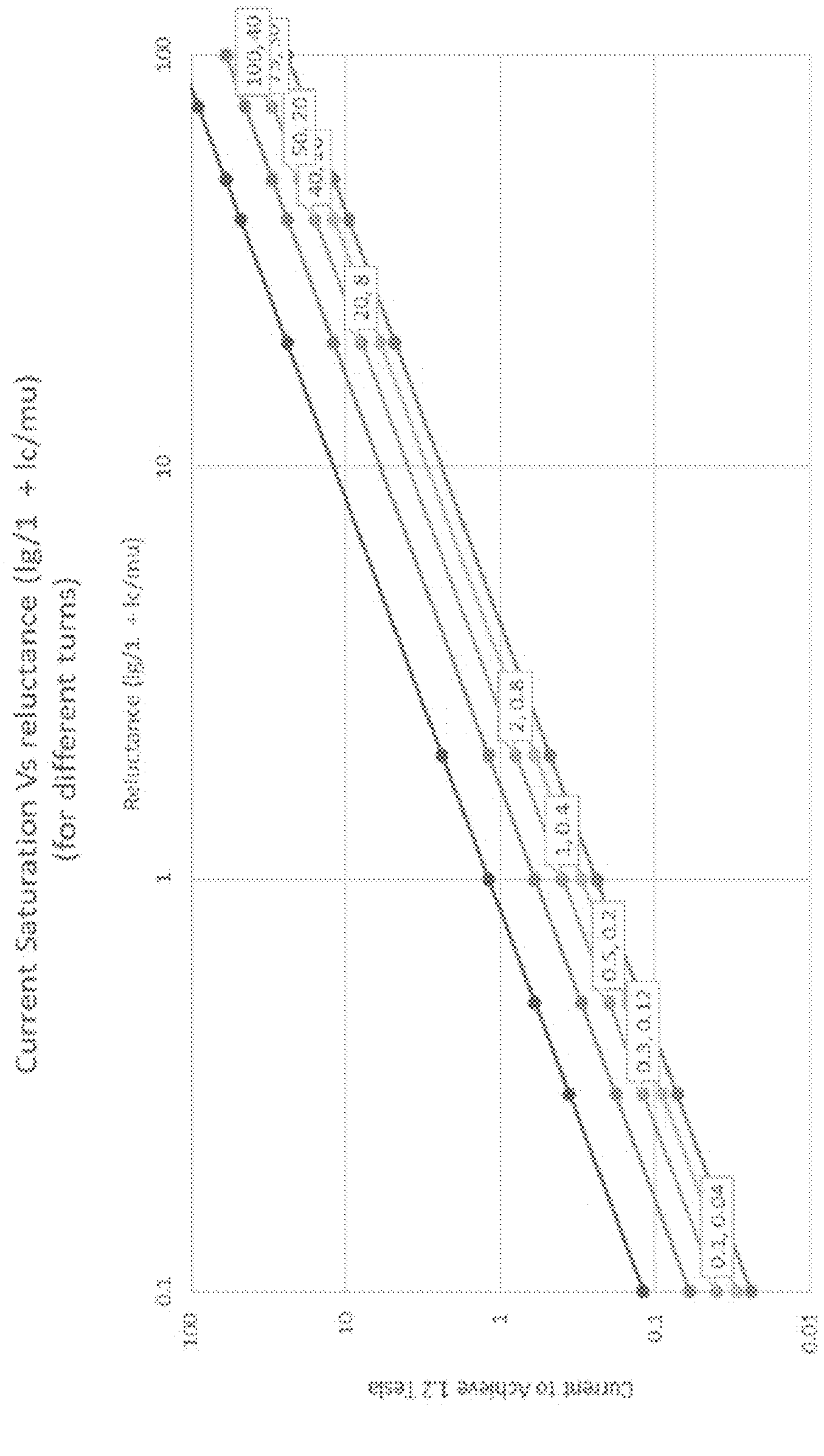
FIG. 27 shows a plot of saturation current to achieve 1.2 Tesla (T) (in Amps (A)) versus reluctance (Ig/1+Ic/mu) for different numbers of turns for toroid inductors.
Figure 28:
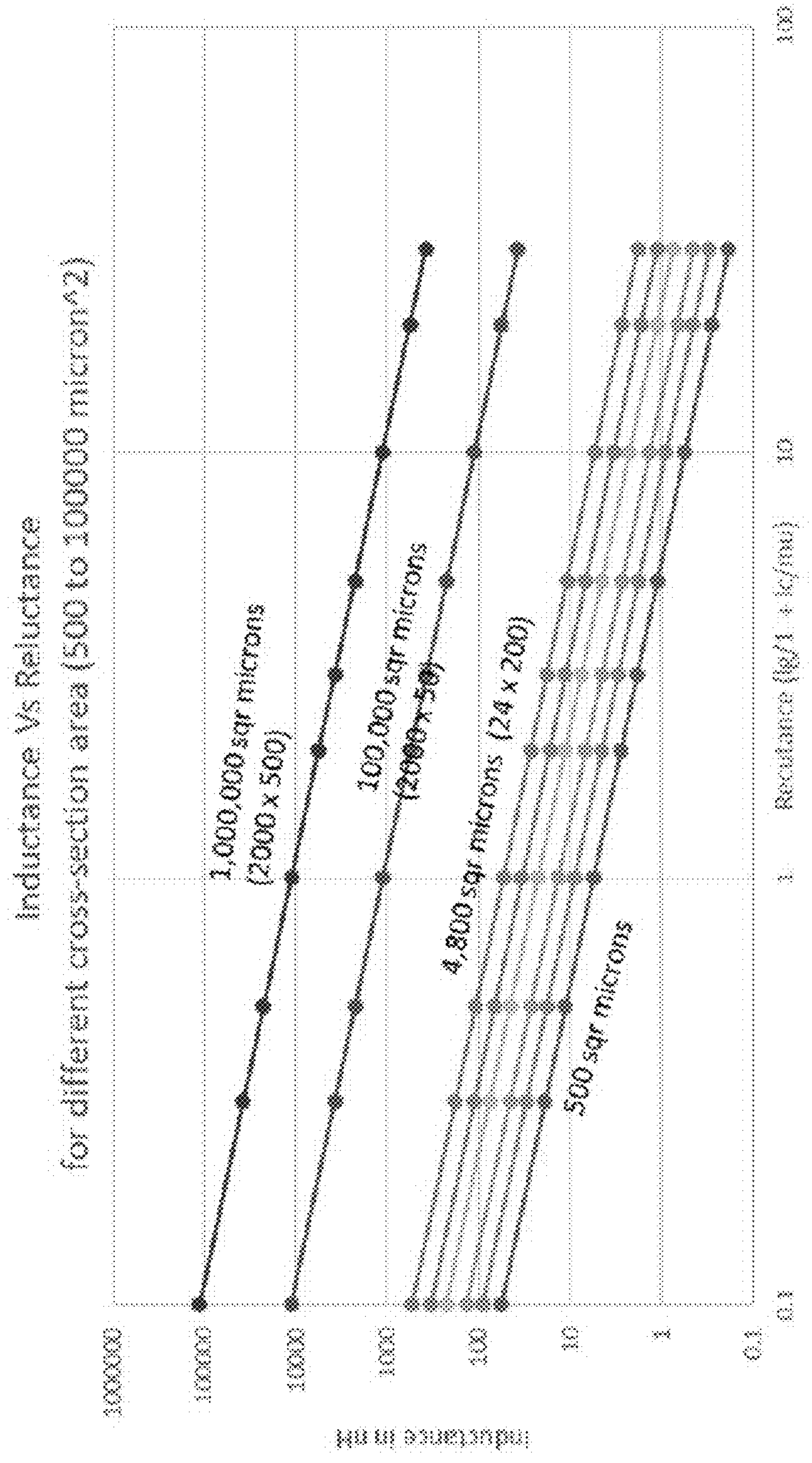
FIG. 28 shows a plot of inductance to achieve 1.2 T (in nH) versus reluctance (Ig/1+Ic/mu) for different cross-sectional areas (footprints, from 500 square micrometers (μm$^2$) to 1,000,000 μm$^2$) for toroid inductors. A current-handling of 1 A per square millimeter (A/mm$^2$) was achieved with a 2000 μm×500 μm (1,000,000 μm$^2$) core cross-section.
Figure 38:
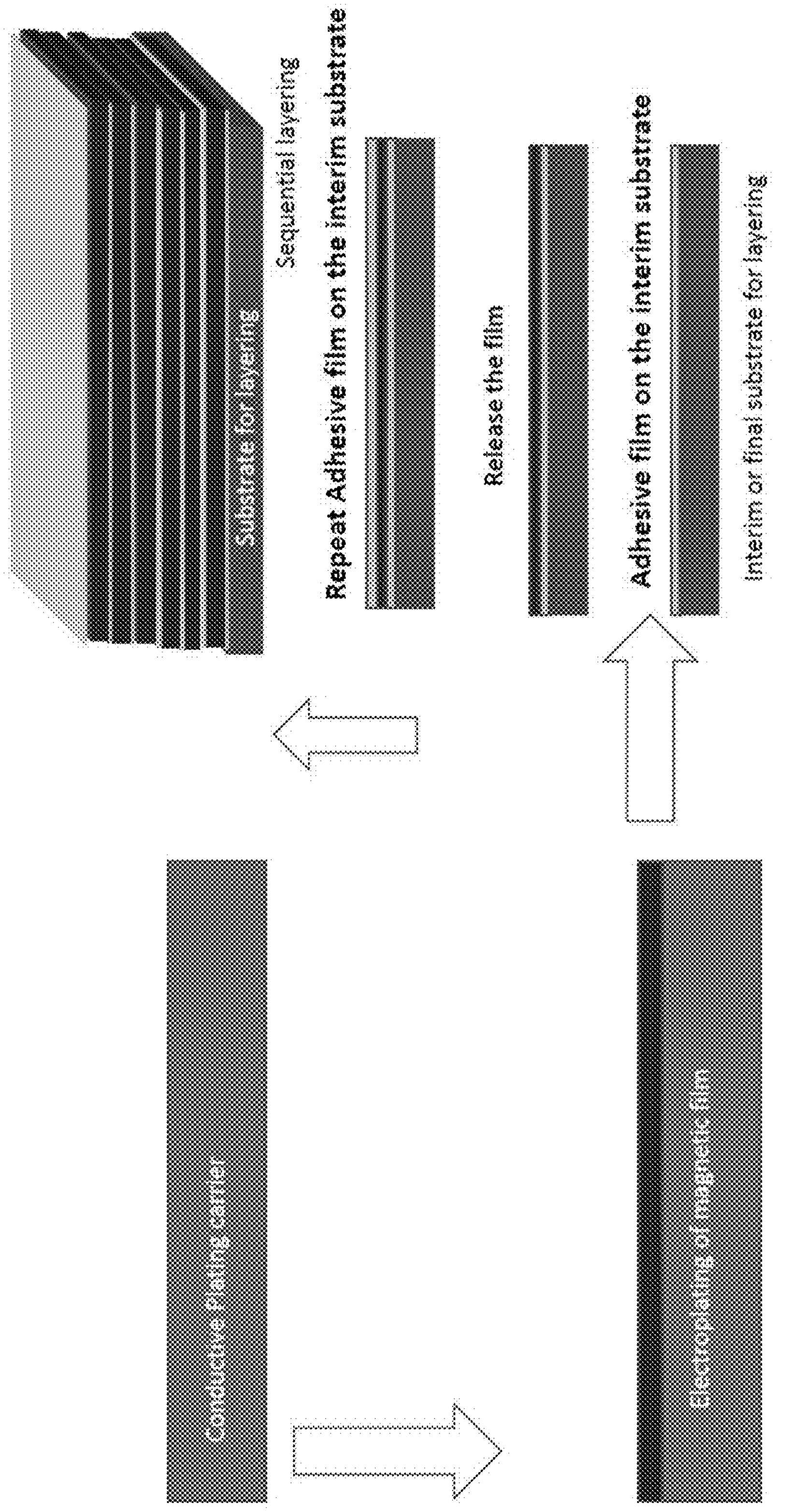
FIG. 38 shows a process flow of a scalable manufacturing approach with a sequential layering process where the magnetic films are transferred onto an adhesive coating that is deposited on the interim substrate or final substrate.
Figure 39:
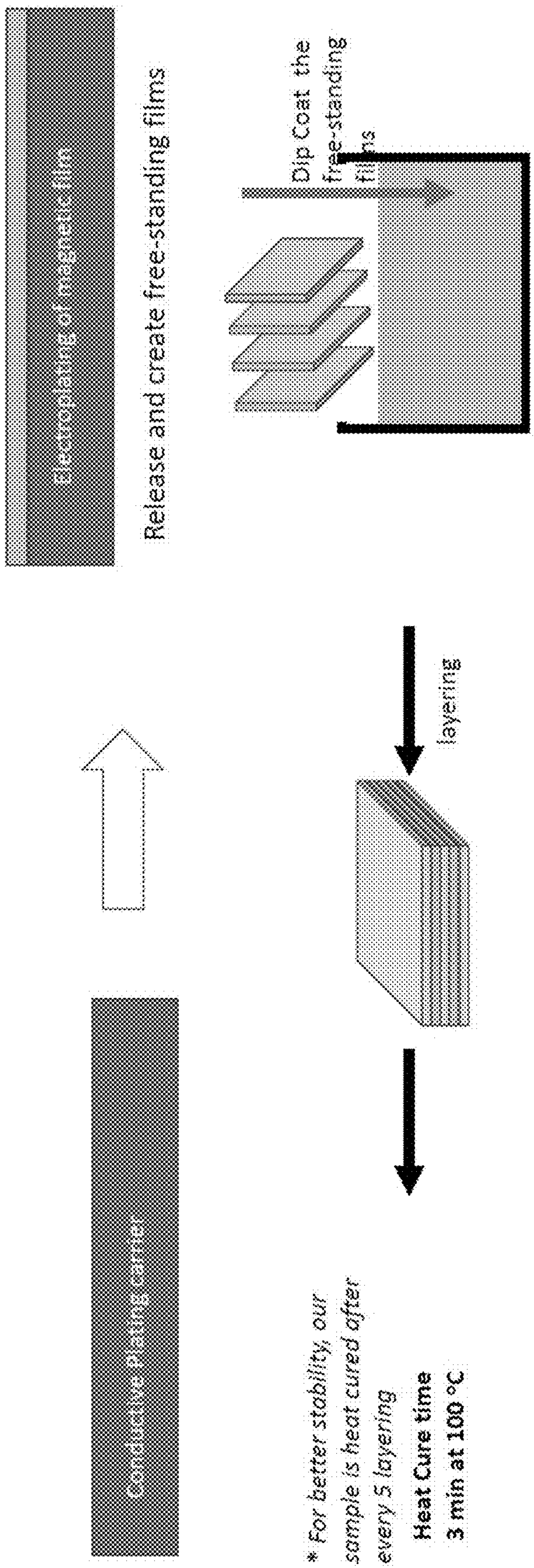
FIG. 39 shows a process flow of a scalable manufacturing approach with a parallel layering process where magnetic films are released from the plating carrier and independently coated with adhesive films while free-standing. Such films with double-side coating can then be stacked and laminated to form the stacked core.

For a toroid of core length of about 9 mm of permeability 300 and airgap of 100 μm, the reluctance is 80 microns from Equation TR2. FIG. 27 shows the saturation current for different reluctance values. Assuming a target of 10 A for 3 turns, the reluctance has to be 20 microns for the complete saturation of the core. This is when the whole core saturates and the permeability almost drops to 1. However, for 20% droop in inductance, it is estimated that the reluctance has to be 4 times higher. This leads to a reluctance target of 80 microns.

After the reluctance is known, the inductance can be estimated from Equation (TR6). The inductance is estimated to be 100 nH for 3 turns, when the cross-sectional area is 2000 microns×500 microns, as shown in FIG. 26. For three turns, estimating the copper length is 8 mm for a copper tape of 500 microns width and 50 micron thickness, the resistance is within the target of 5-10 mΩ. This coil design and toroid core thus meet all the requirements. The designs were then validated with measurements. A commercial magnetic core was cut into a 3 mm square core with a 1 mm cavity inside the core. Copper tape of 500 microns×50 microns was then wound around the toroid as shown in FIG. 29. Initial measurements showed the validation of this geometry as also shown in FIG. 29, thus validating the measurements.

$$L = \frac{N\Phi}{i} = \frac{N^2}{\mathcal{R}} = \frac{N^2}{(\mathcal{R}_m + \mathcal{R}_g)} \sim \frac{A_g\mu_g N^2}{\alpha(L_g)} \quad \text{(Equation: TR6)}$$

$$L = \frac{A_g\ N^2}{\text{Effective Reluctance}} \quad \text{(Equation: TR6)}$$

Example 6

Inductance enhancement (X) factor for different structures of inductors were calculated and are summarized in the table in FIGS. 35 (spirals), 36 (toroids), and 37 (solenoids with open flux path in the top portion and solenoids with closed flux path in the lower portion). Inductance densities of at least 8 nH/mm$^2$ and current densities of at least 1 A/mm$^2$ were achieved with stacked solenoid inductors of closed loop (bottom of the table in FIG. 37).

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. An electrical component, comprising:

a stacked magnetic core comprising a plurality of magnetic films and a plurality of adhesive films stacked in an alternating fashion such that each magnetic film is electrically isolated from each other magnetic film;

a coil wrapped around the plurality of magnetic films; and a magnetic paste disposed around the coil to form a closed magnetic loop with a tuned reluctance in a range of from 5 micrometers (μm) to 100 μm, each magnetic film comprising a monolithic cobalt-nickel-iron (CoNiFe) alloy having a cobalt content of 40-65 atomic percent, a saturation magnetization greater than 2.0 Tesla (D), and a metastable nanostructure with oxides less than 5 nanometers (nm)

each magnetic film being formed by electroplating under application of a uniform unidirectional magnetic field, each adhesive film comprising a spin-coated polymer, the plurality of magnetic films comprising a first magnetic film, a second magnetic film, and a third magnetic film, the plurality of adhesive films comprising a first adhesive film disposed on an upper surface of the first magnetic film and a second adhesive film disposed on an upper surface of the second magnetic film, the second magnetic film being disposed on the first adhesive film, the third magnetic film being disposed on the second adhesive film, the first adhesive film adhering the first magnetic film to the second magnetic film, the second adhesive film adhering the second magnetic film to the third magnetic film, a footprint of the stacked magnetic core, measured in a first plane having the upper surface of the first magnetic film, being 1 square millimeters (mm$^2$) or less, the stacked magnetic core having an inductance density of at least 8 nanohenries per square millimeter (nH/mm$^2$), the stacked magnetic core having a coercivity of no more than 1 Oersted (Oe), a thickness of each adhesive film of the plurality of adhesive films, measured in a first direction perpendicular to the first plane, being in a range of from 0.1 micrometers (μm) to 1 μm, a thickness of each magnetic film of the plurality of magnetic films, measured in the first direction, being in a range of from 0.5 μm to 2 μm, and the electrical component being an inductor or a transformer.

2. An electrical component, comprising:

a first stacked magnetic core comprising a first magnetic film, a first adhesive film disposed on an upper surface of the first magnetic film, and a second magnetic film disposed on the first adhesive film;

a first coil wrapped around the first magnetic film and the second magnetic film; and a magnetic paste disposed around the first coil to form a closed magnetic loop with a tuned reluctance in a range of from 5 μm to 100 μm, each of the first magnetic film and the second magnetic film comprising a monolithic CoNiFe alloy having a cobalt content of 40-65 atomic percent, a saturation magnetization greater than 2.0 T. and a metastable nanostructure with oxides less than 5 nm, each magnetic film being formed by electroplating under application of a uniform unidirectional magnetic field, the first adhesive film comprising a spin-coating polymer, the first adhesive film adhering the first magnetic film to the second magnetic film, the first magnetic film being electrically insulated from the second magnetic film by the first adhesive film, a footprint of the stacked magnetic core, measured in a first plane having the upper surface of the first magnetic film, being 15 square millimeters (mm$^2$) or less, and the electrical component being an inductor or a transformer.

3. The electrical component according to claim 2, further comprising:

a second stacked magnetic core comprising a third magnetic film, a second adhesive film disposed on an upper surface of the third magnetic film, and a fourth magnetic film disposed on the second adhesive film;

a second coil wrapped around the third magnetic film and the fourth magnetic film, the stacked magnetic core with the first coil being disposed above or below the second stacked magnetic core with the second coil.

4. The electrical component according to claim 3, a magnetic flux loop from the first stacked magnetic core to the second stacked magnetic core being closed with the magnetic paste.

5. The electrical component according to claim 2, the footprint of the first stacked magnetic core being 1 mm$^2$ or less.

6. The electrical component according to claim 2, a thickness of the first adhesive film, measured in a first direction perpendicular to the first plane, being in a range of from 0.05 micrometers (μm) to 1 μm.

7. The electrical component according to claim 2, the first stacked magnetic core having an inductance density of at least 8 nanohenries per square millimeter (nH/mm$^2$).

8. The electrical component according to claim 2, the first stacked magnetic core having a coercivity of no more than 1 Oersted (Oe).

9. The electrical component according to claim 2, the first stacked magnetic core comprising a plurality of magnetic films and a plurality of adhesive films stacked in an alternating fashion such that each magnetic film is electrically isolated from each other magnetic film, the plurality of adhesive films comprising the first adhesive film and a second adhesive film disposed on an upper surface of the second magnetic film, and the plurality of magnetic films comprising the first magnetic film, the second magnetic film, and a third magnetic film disposed on the second adhesive film.

10. The electrical component according to claim 9, a thickness of each adhesive film of the plurality of adhesive films, measured in a first direction perpendicular to the first plane, being in a range of from 0.05 micrometers (μm) to 5 μm.

11. The electrical component according to claim 10, the thickness of each adhesive film being in a range of from 0.1 μm to 1 μm.

12. The electrical component according to claim 9, a thickness of each magnetic film of the plurality of magnetic films, measured in a first direction perpendicular to the first plane, being in a range of from 0.1 μm to 5 μm.

13. The electrical component according to claim 12, the thickness of each magnetic film being in a range of from 0.5 μm to 2 μm.

14. The electrical component according to claim 9, each adhesive film of the plurality of adhesive films being a durable, primer-free, spin-coated metal-polymer composite film that cures in 3 minutes or less at 100° C. or below and exhibits high mechanical strength after curing.

15. An electrical component, comprising:

a stacked magnetic core comprising a first magnetic film, a first adhesive film disposed on an upper surface of the first magnetic film, and a second magnetic film disposed on the first adhesive film;

a magnetic paste disposed around the coil to form a closed magnetic loop with a tuned reluctance in a range of from 5 μm to 100 μm; and a coil wrapped around the stacked magnetic core, the first adhesive film adhering the first magnetic film to the second magnetic film, the first magnetic film being electrically insulated from the second magnetic film by the first adhesive film, each of the first magnetic film and the second magnetic film comprising a monolithic CoNiFe alloy having a cobalt content of 40-65 atomic percent, a saturation magnetization greater than 2.0 T. and a metastable nanostructure with oxides less than 5 nm, each magnetic film being formed by electroplating under application of a uniform unidirectional magnetic field, the first adhesive film comprising a spin-coating polymer the stacked magnetic core being disposed in a closed loop, the closed loop having a discontinuity in the closed loop forming an air gap, the closed loop being shaped as a toroid or a rectangular frame, and the magnetic paste being disposed inside the airgap.

16. The electrical component according to claim 15, the magnetic paste being further disposed around the coil to form a closed magnetic loop.

* * * * *